United States Patent
Ermagan et al.

(10) Patent No.: US 10,637,889 B2
(45) Date of Patent: Apr. 28, 2020

(54) SYSTEMS, METHODS, AND DEVICES FOR SMART MAPPING AND VPN POLICY ENFORCEMENT

(71) Applicant: CISCO TECHNOLOGY, INC., San Jose, CA (US)

(72) Inventors: Vina Ermagan, San Jose, CA (US); Fabio R. Maino, Palo Alto, CA (US); Florin T. Coras, Barcelona (ES); Marius Horia Miclea, Epalinges (CH); John William Evans, Frome (GB); Paul Quinn, Wellesley, MA (US); Darrel Jay Lewis, San Mateo, CA (US); Brian E. Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 339 days.

(21) Appl. No.: 15/217,154

(22) Filed: Jul. 22, 2016

(65) Prior Publication Data
US 2017/0026417 A1  Jan. 26, 2017

Related U.S. Application Data

(60) Provisional application No. 62/207,139, filed on Aug. 19, 2015, provisional application No. 62/207,174, filed on Aug. 19, 2015.

(30) Foreign Application Priority Data

Jul. 23, 2015  (ES) .................................. 201531092
Jul. 23, 2015  (ES) .................................. 201531093

(51) Int. Cl.
*H04L 29/06* (2006.01)
*H04L 12/46* (2006.01)
(Continued)

(52) U.S. Cl.
CPC .......... *H04L 63/20* (2013.01); *H04L 12/4633* (2013.01); *H04L 12/4641* (2013.01);
(Continued)

(58) Field of Classification Search
CPC ..... H04L 12/4633; H04L 63/20; H04L 63/08; H04L 61/2592; H04L 63/251;
(Continued)

(56) References Cited

U.S. PATENT DOCUMENTS

2012/0173694 A1*  7/2012  Yan ..................... H04L 12/4641
709/223

OTHER PUBLICATIONS

Rodriguez-Natal et al.,"Software Defined Networking extensions for the Locator/ID Seperation Protocol", Feb. 2014, pp. 1-8 https://trac.tools.ietf.org/id/draft-rodrigueznatal-lisp-sdn-00.txt (Year: 2014).*
(Continued)

*Primary Examiner* — Robert B Leung
*Assistant Examiner* — Carlos M De Jesus Lassala

(57) ABSTRACT

Aspects of the embodiments are directed to systems, methods, and computer program products to program, via a northbound interface, a mapping between an endpoint identifier (EID) and a routing locator (RLOC) directly into a mapping database at a mapping system; receive, from a first tunneling router associated with a first virtual network, a mapping request to a second virtual network, the first router compliant with a Locator/ID Separation Protocol, the mapping request comprising an EID tuple that includes a source identifier and a destination identifier; identify an RLOC based, at least in part, on the destination identifier of the EID tuple from the mapping database; and transmit the RLOC to the first tunneling router implementing an high level policy that has been dynamically resolved into a state of the mapping database.

28 Claims, 18 Drawing Sheets

(51) Int. Cl.
*H04L 12/741* (2013.01)
*H04L 29/12* (2006.01)
*H04L 12/715* (2013.01)
*H04L 12/70* (2013.01)

(52) U.S. Cl.
CPC ........ *H04L 29/06612* (2013.01); *H04L 45/54* (2013.01); *H04L 61/251* (2013.01); *H04L 63/029* (2013.01); *H04L 63/0272* (2013.01); *H04L 63/0428* (2013.01); *H04L 63/06* (2013.01); *H04L 69/03* (2013.01); *H04L 45/64* (2013.01); *H04L 45/74* (2013.01); *H04L 2012/5621* (2013.01)

(58) Field of Classification Search
CPC ............... H04L 63/0272; H04L 63/029; H04L 63/0428; H04L 63/06; H04L 12/4641; H04L 63/0407; H04L 45/54; H04L 45/74; H04L 45/64; H04L 12/5621; H04L 61/251; H04L 29/06612
See application file for complete search history.

(56) References Cited

OTHER PUBLICATIONS

Fuller, "Locator/ID Sepration Protocol (LISP) Map-Server Interface" Jan. 2013, pp. 1-13, https://tools.ietf.org/html/rfc6833 (Year: 2013).*

Farinacci et al., "The Locator/ID Seperation Procotol (LISP)", Jan. 2013, pp. 1-74, https://tools.ietf.org/html/rfc6830 (Year: 2013).*

Barkai et al., "LISP Based FlowMapping for Scaling NFV" May 2015, pp. 1-16 https://tools.ietf.org/html/draft-barkai-lisp-nfv-06 (Year: 2015).*

Mestery, "LISP and NSH in Open vSwtich" https://web.archive.org/web/20141203053347/https://www.slideshare.net/mestery/lisp-and-nsh-in-open-vswitch (Year: 2014).*

Brockners et al., "Lisp Extensions for Segment Routing" RFC draft, pp. 1-11, https://tools.ietf.org/html/draft-brockners-lisp-sr-01 (Year: 2014).*

NTC., "Reverse DNS" NTC hosting, Oct. 2014, pp. 1-6 https://web.archive.org/web/20141023034738/http://www.ntchosting.com/encyclopedia/dns/reverse-dns/ (Year: 2014).*

PCT Dec. 22, 2016 International Search Report and Written Opinion of the International Search Authority from the International Application No. PCT/US2016/043913.

Barkai, S., et al., "LISP Based Flowmapping for Scaling NFV," LISP Working Group Internet-Draft, draft-barkai-lisp-nfv-06, May 1, 2015; 16 pages.

Farinacci, D., et al., "LISP Canonical Address Format (LCAF)," Network Working Group Internet-Draft, draft-ietf-lisp-lcaf-10, Jun. 12, 2015; 37 pages.

Farinacci, D., et al., "LISP Traffic Engineering Use-Cases," Internet Engineering Task Force Internet-Draft, draft-farinacci-lisp-te-08, Mar. 23, 2015; 17 pages.

Fuller, V., et al., "Locator/ID Separation Protocol (LISP) Map-Server Interface," Internet Engineering Task Force, RFC 6833, Jan. 2013; 13 pages.

Rodriguez-Natal, A., et al., "LISP Support for Multi-Tuple EIDs," LISP Working Group Internet-Draft, draft-rodrigueznatal-lisp-multi-tuple-eids-00, Jul. 5, 2015; 9 pages.

Rodriguez-Natal, A., et al., "Software Defined Networking Extensions for the Locator/ID Separation Protocol," LISP Working Group Internet-Draft, draft-rodrigueznatal-lisp-sdn-00, Feb. 7, 2014; 8 pages.

Examination Report in counterpart European Application No. 16747954.2, dated Feb. 14, 2019, 9 pages.

* cited by examiner

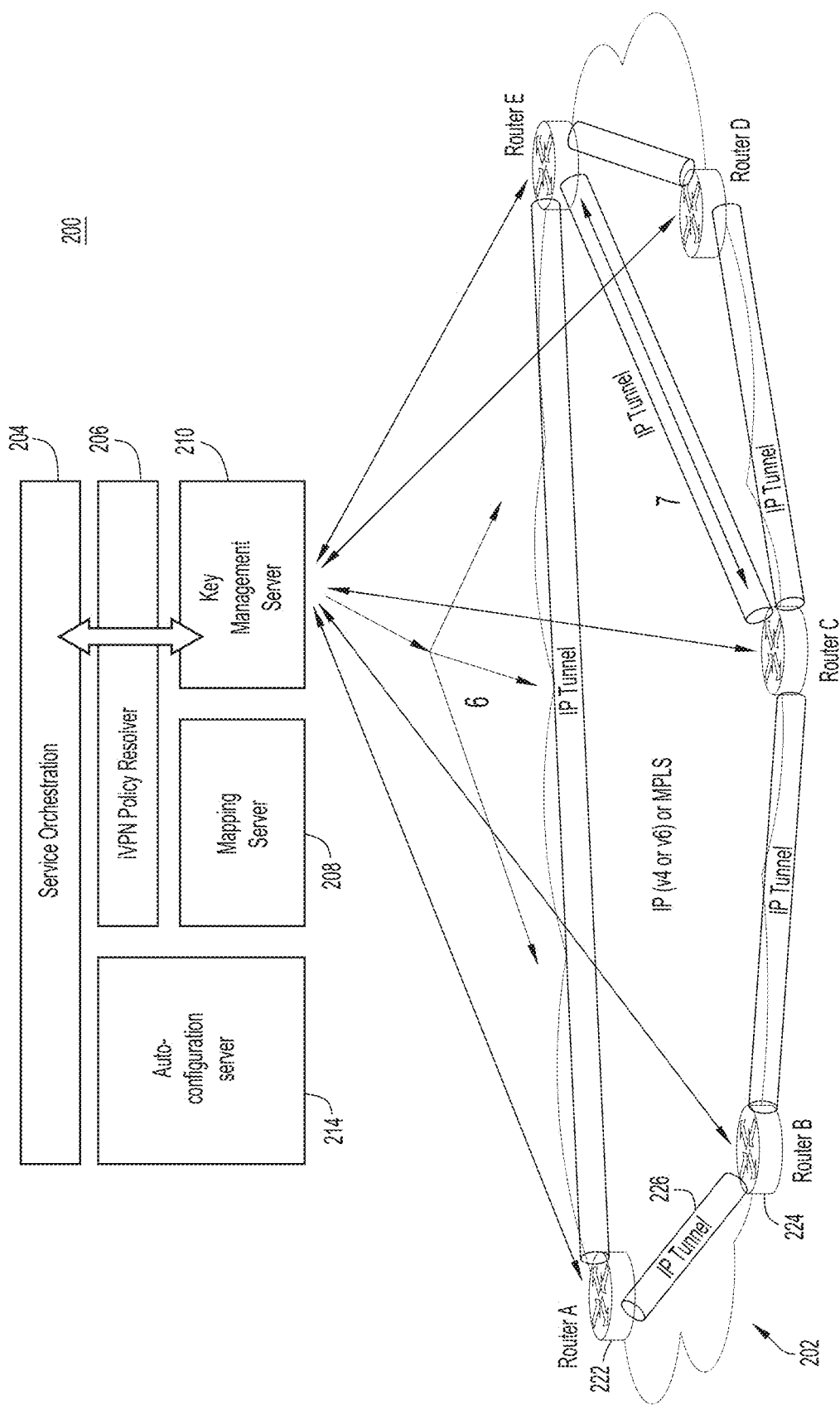

SYSTEMS, METHODS, AND DEVICES FOR SMART MAPPING AND VPN POLICY ENFORCEMENT

CROSS-REFERENCE TO RELATED APPLICATION

This application claims the benefit of priority under 35 U.S.C. § 119(e) to U.S. Provisional Application Ser. No. 62/207,139, entitled "VPN POLICY RESOLVER," filed on Aug. 19, 2015. The application also claims the benefit of priority under 35 U.S.C. § 119(e) to U.S. Provisional Application Ser. No. 62/207,174, entitled "OVERLAY SYSTEM FOR CUSTOMER-CUSTOMER L3 VIRTUAL PRIVATE NETWORKING," filed on Aug. 19, 2015.

CLAIM OF PRIORITY

This application claims priority to the Spain Patent Application filed on Jul. 23, 2015, ES Application Serial No. P201531092 and entitled "OVERLAY-BASED SECURITY GROUP POLICY ENFORCEMENT." This application also claims priority to the Spain Patent Application filed on Jul. 23, 2015, ES Application Serial No. P201531093 and entitled "SMART MAPPING SYSTEM FOR VPN/DC POLICY ENFORCEMENTS."

TECHNICAL FIELD

This disclosure relates in general to the field of computer networking and, more particularly, to techniques for smart mapping between the overlay and the underlay networks.

BACKGROUND

Networks used in computing environments can be configured in many different manners. For example, a Local Area Network (LAN) is a group of computing devices that share a common communications line. Computing and storage resources can be shared within a LAN. Moreover, a LAN can be as small as a few computing devices or as large as an entire enterprise (e.g., office building, office complex, and the like). Another network configuration is a Wide Area Network (WAN). A WAN is a geographically dispersed telecommunications network. A classic example of a WAN is the Internet. A third network configuration is a Metropolitan Area Network (MAN), where computing devices are connected in a geographic region or specific area that is larger than a LAN and smaller than the typical WAN. Also, in recent years a new type of network, referred to as a Virtual Private Network (VPN), has emerged in the industry. A VPN is a private network that takes advantage of public telecommunications and maintains privacy through use of tunneling protocols and security procedures.

For example, a company or business may enable a VPN within its network, and a public network (e.g., the Internet) may be used to route communications between a remote device and devices within the company's VPN. Thus, remote devices can use "virtual" connections via a public network to connect to, and exchange secure communications with, devices within a VPN. These communications can also be encrypted so that devices that are not authenticated or otherwise allowed to access the VPN are unable to decrypt and access the communications.

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resources as required, including applications, hosts, appliances, and storage. Improving operational efficiency and optimizing utilization of resources in such data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

Similar issues and requirements arise in context of Virtual Private Networks (VPNs).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3A-D are schematic diagrams of an iVPN component operation in accordance with embodiments of the present disclosure.

DETAILED DESCRIPTION

Figure 1:
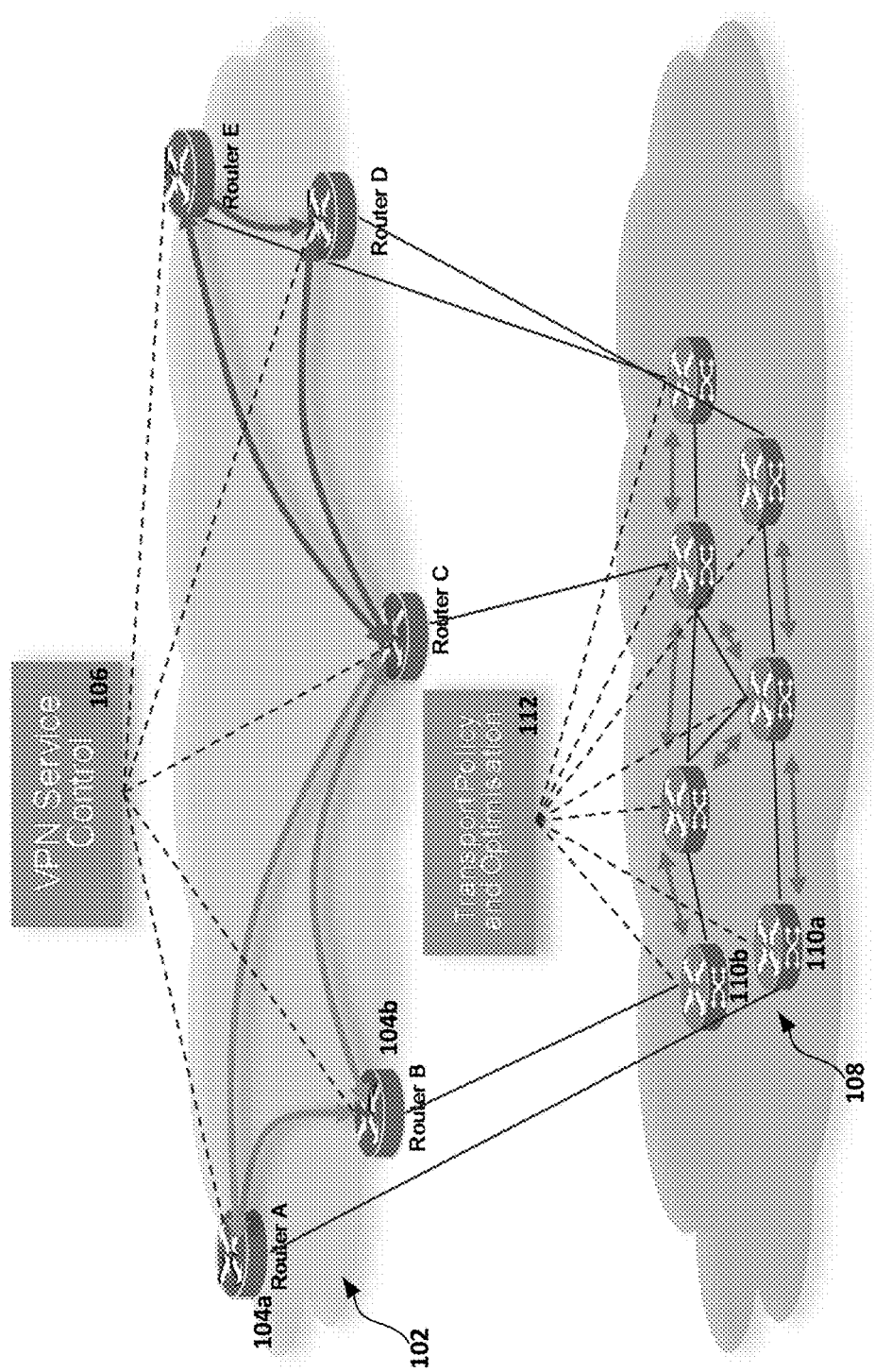
FIG. 1 is a schematic diagram of a hybrid software defined network in accordance with embodiments of the present disclosure.

Part I. Overlay System for Virtual Private Networking
Overview iVPN is an architecture for IP overlay L2/L3 VPNs which has the following characteristics. The iVPN has an open system architecture, which can include a loosely coupled architecture based on open standards and open source software. iVPN includes an SDN-based approach with centralized service control providing a single policy control point for simplified orchestration and management. The iVPN integrates VPN policy, Traffic Engineering (Segment Routing) policy, and service insertion (NSH) policy which simplifies applying services in combination and enables the network operator to exploit the value of the underlying networks and services. The iVPN should provide enterprise grade security and encryption.

The iVPN can facilitate multitenancy and state scale by having separate control infrastructure per tenant and achieve high availability and transactional scale through clustering tenant control functions.

The iVPN can scale horizontally, is well suited to virtualization and can provide a VPNaaS platform for delivering higher-order services. The iVPN provides policy flexibility which enables policies to be defined in terms of contracts, that simplify the management of network policies and makes them more closely and aligned to business-level policy intent. The iVPN provides an equivalent and complimentary capability set to MPLS VPN and can be integrated with existing MPLS VPN.

Described herein is an edge-to-edge IP Overlay Layer 2 (L2)/Layer 3 (L3) Virtual Private Network (VPN) system architecture and associated techniques that utilize a centralized control infrastructure as the single policy control point for all network services, thereby integrating VPN policy, Traffic Engineering (Segment Routing) policy, and service insertion policy (NSH).

Example Embodiments

Current Virtual Private Network (VPN) technologies use distributed network protocols to create VPNs for customers on top of a shared network infrastructure (e.g., either Multiprotocol Label Switching (MPLS) or Internet Protocol (IP) based) that interconnects Customer Premises Equipment (CPE). MPLS-based VPNs are mature and offer a rich set of VPN features and functionality such as, for example, support for complex VPN topologies. These complex VPN technologies can be used in combination with Traffic Engineering (i.e. Resource Reservation Protocol-Traffic Engineering (RSVP-TE) or Segment Routing) or service chaining technologies (i.e., a Network Service Header (NSH)). However, these are independent technologies with no explicit integration. Therefore, when these technologies are used together, a higher level orchestration system is required to configure the separate technologies so that they work in concert in order to create end-to-end services. In practice, the creation of the higher level orchestration system can be very complicated, with each technology having different dependencies requiring separate configuration, which may in turn impact different devices. As a result, in conventional arrangements, these technologies are generally not used in concert, but instead are deployed and operated independently. This independent operation limits the ability of a network operator (Service Provider) to exploit the value of the underlying networks and services.

Despite their richness of features and functionality, Service Provider (SP) virtual private networks built on MPLS are being challenged today because they are perceived as complex, slow to provision, difficult to manage, and expensive. The distributed network protocols are further challenged to scale to the aggregated number of routes across the VPNs of the service provider's tenants. Additionally, since VPN services are virtualized and separated from the underlying transport, the hierarchical functional decomposition of MPLS VPNs (e.g., customer edge (CE), provider edge (PE), and/or Provider (P) components) has been aligned to the physical network hierarchy. However, this hierarchy is no longer required and instead incurs cost and complexity and is not well suited to deliver, for example, VPN as a Service (VPNaaS).

CPE-to-CPE IP overlay VPNs potentially offer the lowest cost solution because such configurations remove the need for any service aware routers at the core and edge of the network (i.e., at the PE and P routers). However, there are no CPE-to-CPE overlay VPN control plane/data plane solutions which provide the functionality and scale needed for Service Providers to meet enterprise requirements. Furthermore, IP overlay VPNs today treat the Service Provider underlay network as a simple (i.e., "dumb") transport, which limits the ability to exploit the value of the underlying networks and services. That is, the underlying networks/services do not have an understanding of, or integration with, the Segment Routing.

In conventional practical arrangements, different VPN technologies are applied in different market segments (e.g., MPLS VPNs in enterprise, Dynamic Multipoint VPNs (DM-VPNs) in Small and Medium enterprises (SMEs), hub/spoke Internet Protocol Security (IPsec) in Small and Medium Businesses (SMBs), etc.).

Presented herein is a new edge-to-edge IP Overlay Layer 2 (L2)/Layer 3 (L3) VPN system architecture and associated techniques that integrate VPN policy, Traffic Engineering (i.e., Segment Routing) policy, and service insertion policy (NSH). The VPN system architecture and associated techniques, which are sometimes collectively and general referred to herein as is "iVPN," utilize a centralized control infrastructure as the single policy control point for all network services. In general, iVPN leverages and enhances the Locator/ID Separation Protocol (LISP) Architecture and uses Centralized Key Management (CKM).

In general, iVPN provides functionality similar to MPLS VPN on a lower cost base, scales horizontally, and can meet the combined service provider requirements of Enterprise (i.e., full feature), SME, SMB and consumer (i.e. full scale) use cases. iVPN further provides the agility and simplified centralized management of, for example, Software-Defined WAN (SDWAN) solutions, while providing enterprise class security and encryption, and enabling the network operator to exploit the value of the underlying networks and services through the integration of the VPN policy, Traffic Engineering, and service insertion policy. iVPN may also operate over heterogeneous IP or MPLS networks, is based on open standards and open source software, is well suited to virtualization, and provides a VPNaaS platform for delivering higher order services.

FIG. 1 is a schematic block diagram illustrating a hybrid model of a software defined network in accordance with embodiments of the present disclosure. The use of an IP overlay enables separation of the control of the IP transport underlay 108 and the VPN service overlay 102; this allows optimal approaches to be applied to the control of the underlay and overlay.

Underlay control 112 can include routing and optimization. The underlay network is characterized by the requirement to provide a highly resilient transport capability, which can deal with ad hoc topologies and rapidly converge following changes in topology. The underlay network 108 can include a plurality of routers, such as routers 110a and 110b. This is well suited to distributed network routing protocols. Optimization of the transport underlay requires centralized control to augment the distributed network routing protocols.

VPN service controller 106 can include routing function, as well as the service orchestration, autoconfiguration, policy resolution, mapping, and key management, as described in FIG. 2 below. The overlay can include virtualized routers, such as routers 104a and 104b. Routing in the service overlay includes VPN network topologies that can adapt to reachability of the next hop. Hence routing in the service overlay is well suited to centralized control, which offers simplification with enhanced scale and control.

As a result, iVPN is the realization of a hybrid SDN approach with centralized control of the service overlay, which can be used in conjunction with distributed control of the transport underlay, as shown in FIG. 1.

Figure 2:
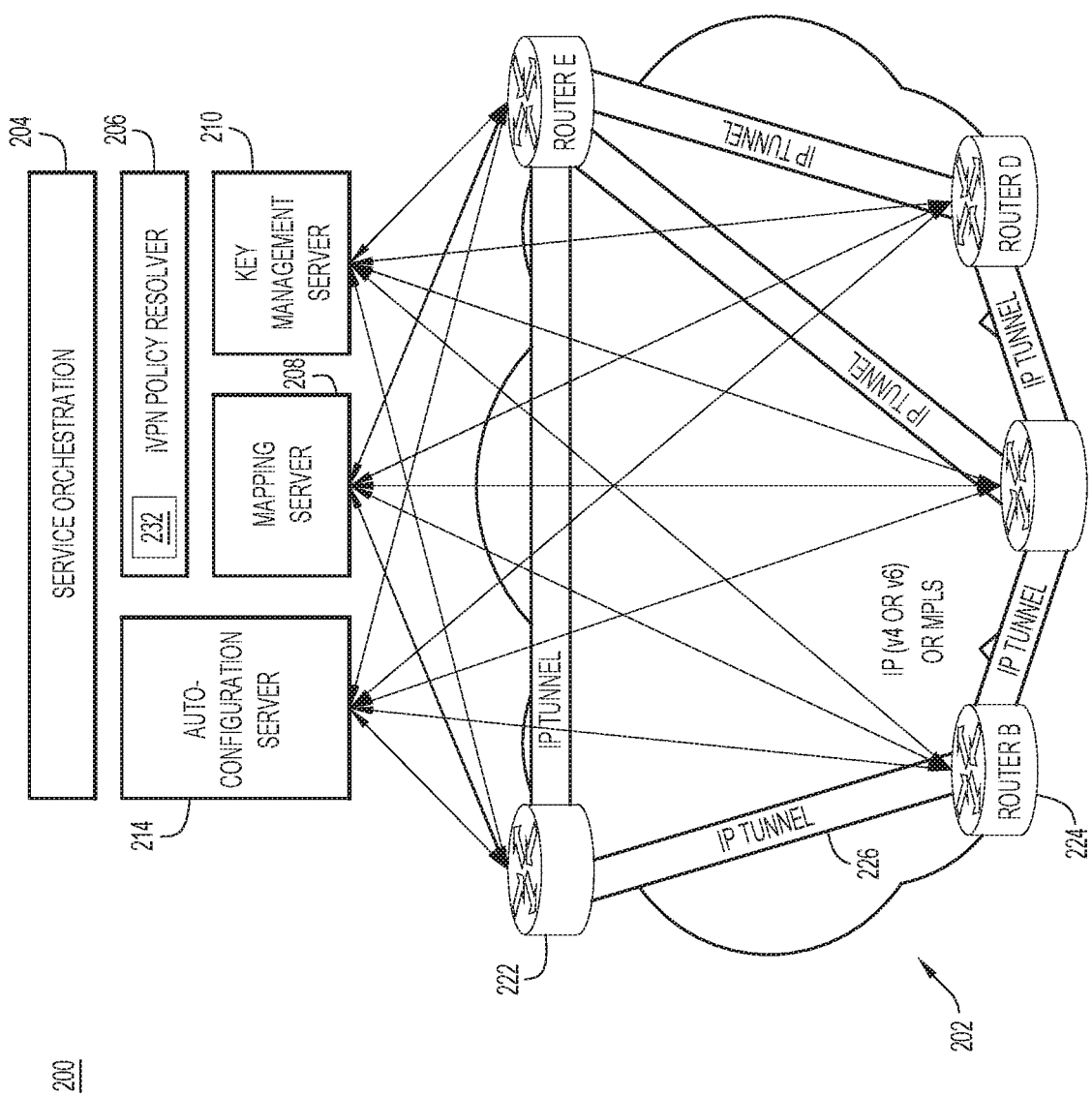
FIG. 2 is schematic diagram illustrating an iVPN system architecture in accordance with embodiments of the present disclosure.

FIG. 2 is schematic block diagram illustrating an iVPN system architecture 200 in accordance with examples presented herein. The iVPN system architecture 200 uses a centralized control infrastructure which is realized with the components shown in FIG. 2. These components include an orchestration function 204, a (stateless) policy resolution function (policy resolver) 206, a forwarding state (mapping server) server 208, a key management and crypto server (key management server) 210, and an auto-configuration server 214. iVPN is a loosely coupled system architecture which uses a centralized control infrastructure and is realized with the forgoing components, each of which are described in greater detail below.

The iVPN system architecture 200 can support a network 202, such as an IP network (IPv4 or IPv6) or MPLS network. The network 202 can include routers, such as router 222 and router 224.

The orchestrator 204 is a cross domain orchestrator that is responsible for instantiating the end-to-end services by pushing abstracted service policies to the policy resolution function. The orchestrator 204 is multitenant and maintains the database of policies that have been applied. The orchestration cross domain orchestration which instantiates the e2e service by pushing abstracted service policies (VPN, SR and NSH) to the mapping server.

The policy resolver 206 is the single point for applying policies in the system. The policy resolution function 206 exposes an abstracted northbound interface 232 to the higher level orchestrator 204 and can apply policies that include, for example, VPN connectivity policies, Traffic engineering policies, Service insertion policies, and Crypto and/or Encryption policies. The policy resolution function 206 is responsible for resolving discrete policies to forwarding state, compounding and reconciling overlapping policies, pushing the resulting resolved forwarding state to the forwarding state server, from which it is served to clients, and pushing resolved Crypto and Encryption policies to the Key Management and Crypto Server 210. The policy resolution function is multitenant and stateless.

The policy resolver presents an abstracted northbound interface (NBI) 232 to an orchestrator 204, resolves policies to forwarding state and pushes resulting forwarding state to mapping server.

The forwarding state server 208 (e.g., LISP mapping server) stores and serves all resolved forwarding state for VPN connectivity, Traffic Engineering (i.e., Segment Routing), and service insertion (i.e., NSH) policies. The forwarding state server 208 is programmed by the policy resolution function. Multiple forwarding state servers may be used for resiliency, scale and multitenancy (i.e., separate servers are used per tenant). Forwarding state is pushed to VPN edge routers using, for example, LISP with appropriate LISP Canonical Address Format (LCAF) extensions, which reflects an enhancement to the LISP.

The key management server 210 stores and serves all crypto and encryption policies and keys and is programmed by the policy resolution function 206. Multiple key management servers may be used for resiliency, scale and multitenancy (i.e., separate key management servers are used per tenant). Key state is served to VPN edge routers using, for example, The Group Domain of Interpretation (GDOI). As shown in FIG. 2, VPN edge routers (e.g., 222 and 224) are interconnected by IP overlay tunnels 226 established over an underlying IP or MPLS transport network 202.

The auto-configuration server 214 can authenticate and authorize routers in the underlay network (e.g., CPEs) and can service day-0 configuration. The auto configuration server is responsible for authenticating and authorizing the CPE 222 and serving the day-0 config. The auto configuration process can include the following steps: The CPE 222 is "claimed" by the orchestrator 204. The CPE 222 boots and registers with auto-configuration server 214 (IP+serial+model+capabilities). The CPE 222 is authenticated and authorized by auto-configuration server 214.

CPE 222 is served with appropriate day-0 config which includes baseline configuration including the IP addresses of corresponding route/map server and key management server for the tenant. The service orchestrator 204 triggers the further orchestration steps.

One feature of the iVPN system architecture 200 which differentiates iVPN from conventional VPN architectures is the use of the policy resolution function 206, which is a single point of policy control point for VPN, Traffic Engineering, Service Insertion and Encryption/Crypto policies, and which programs the forwarding state server 208 and key management server 210. Another feature of the iVPN system architecture 200 that differentiates iVPN system architecture 200 from conventional VPN architectures is the use of the forwarding state server 208 (e.g., LISP mapping server) to maintain all forwarding state (i.e., all resolved forwarding state for VPN connectivity, Traffic Engineering, and service insertion policies). A further feature of the iVPN system architecture 200 that differentiates iVPN from conventional VPN architectures is the use of LISP to push forwarding state to the CPE on a policy change using LCAF extensions, in addition to the conventional LISP pull model of operation.

In summary, iVPN is an edge-to-edge IP Overlay L2/L3 VPN system architecture that enhances the LISP architecture to integrate VPN policy, Traffic Engineering (Segment Routing) policy and service insertion policy (NSH), utilizing a centralized control infrastructure as the single policy control point for all network services. iVPN provides functionality similar to that of MPLS VPNs and supports policy based VPN connectivity, such as complex VPN topologies that LISP, DMVPNs, and hub-spoke VPNs do not. For example, LISP, DMVPN, hub-spoke VPN arrangements require policy configuration at CPE, MPLS VPN arrangements require policy configuration at a PE, etc. (i.e., other VPN technologies require policy configuration in multiple places). iVPN 200 also has a minimal cost base (i.e., lower cost base than MPLS VPNs which have dependency on CE/PE hierarchy, MPLS enabled routers etc.). The integration of VPN policy, Traffic Engineering, and service insertion policy (NSH) in iVPN 200 enables the network operator to exploit the value of the underlying networks and services. Conventional VPN architectures lack this integration and rely upon independent Traffic Engineering and Service Insertion. As such, conventional arrangements require a higher level orchestration system to configure the separate technologies so that they work in concert in order to create end-to-end services. In practice, this can be complicated, with each technology having different dependencies that require separate configuration, which may in turn impact different devices. As a result, conventional VPN technologies are generally not used in concert but rather deployed and operated independently. This limits the ability of a network operator to exploit the value of the underlying networks and services.

iVPN also scales horizontally and can meet the combined service provide requirements of Enterprise (i.e. full feature), SME, SMB, and consumer (i.e. full scale) users. All components of the architecture can scale horizontally to address transactional scale. State scale is dealt with by partitioning state per tenant. In contrast, prefix scale is a significant constraint with conventional MPLS VPNs, where distributed routing protocol instances are challenged to scale to the aggregated number of routes across the VPNs of the service provider's tenants. Additionally, hub/spoke VPN and DMVPN arrangements are limited both by the number of routing protocol adjacencies that can be supported as well as the number of prefixes that can be supported. The iVPN system architecture is well suited to virtualization and provides a VPNaaS platform for delivering higher-order services.

Figure 3A:
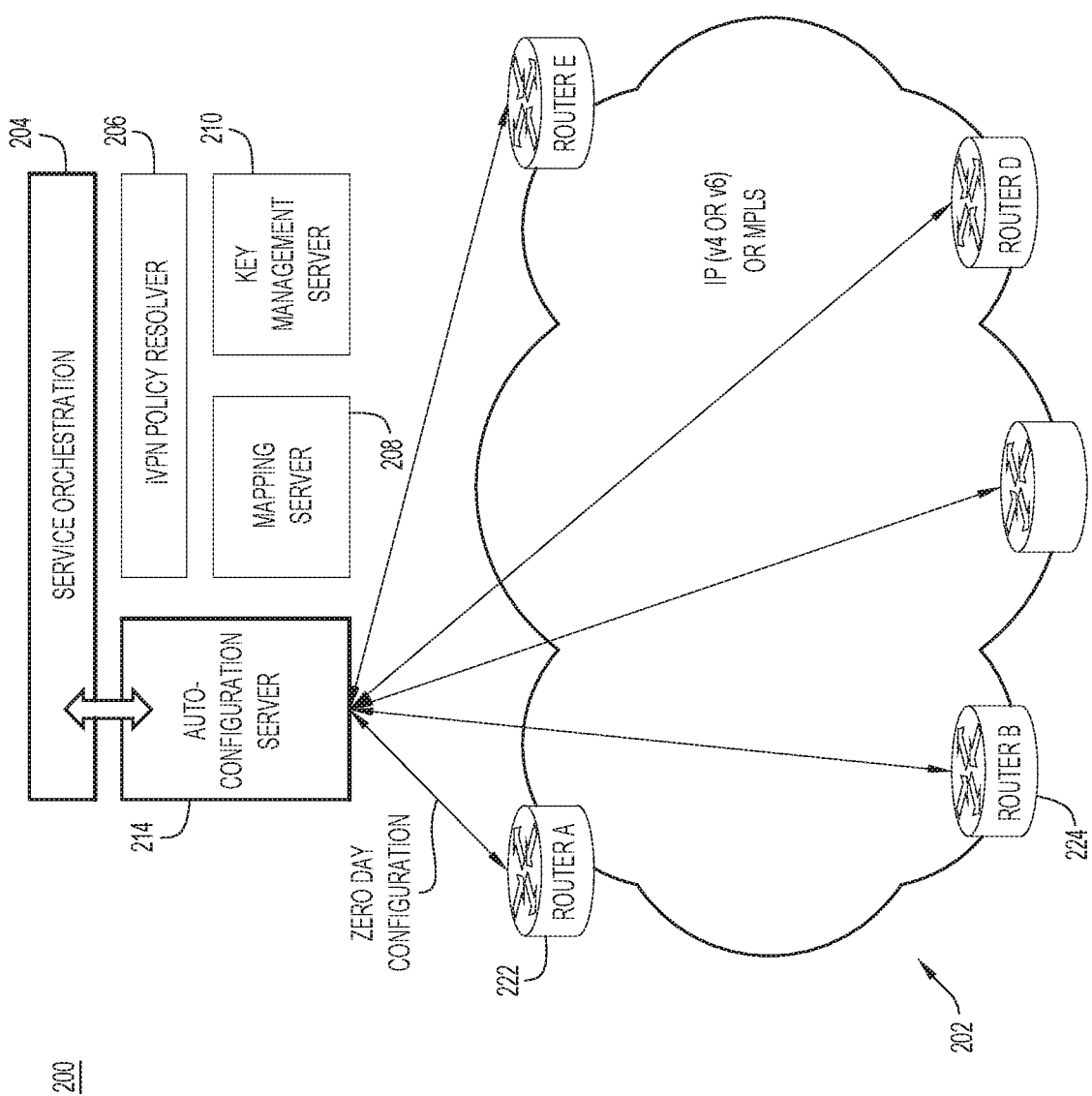

FIG. 3A-D are schematic diagrams of an iVPN component operation in accordance with embodiments of the present disclosure. FIG. 3A illustrates autoconfiguration of customer premises equipment (CPE) (e.g., router 222) in accordance with embodiments of the present disclosure. The CPE 222 can boot and register with autoconfiguration server 214. The CPE can provide IP, serial number, model number, capabilities, etc. The CPE 222 can be authenticated and authorized. The autoconfiguration server can provide the CPE 222 with appropriate zero day configuration. The zero day configuration includes IP addresses of corresponding mapping servers 208 and key management severs 210.

FIG. 3B illustrates centralized management of keys in accordance with embodiments of the present disclosure. The orchestrator 204 can push security policies to the key management server (KMS) 210. One or more VPN gateways can register with the KMS 210 (e.g., using GDOI or G-IKFv2). VPN gateways are authenticated and authorized before admission to VPN. The KMS downloads keying material for the one or more routers (e.g., VPN Gateways). The VPN Gateways setup an IPsec-encrypted overlay using downloaded keying material. The KMS performs a Rekey (multicast or unicast) using GDOI or G-IKFv2. The rekeying frequency is based on site security policy. A VPN administrator can remove a VPN gateway identified as no longer trusted with a single action on a key server, with immediate effect.

Figure 3C:
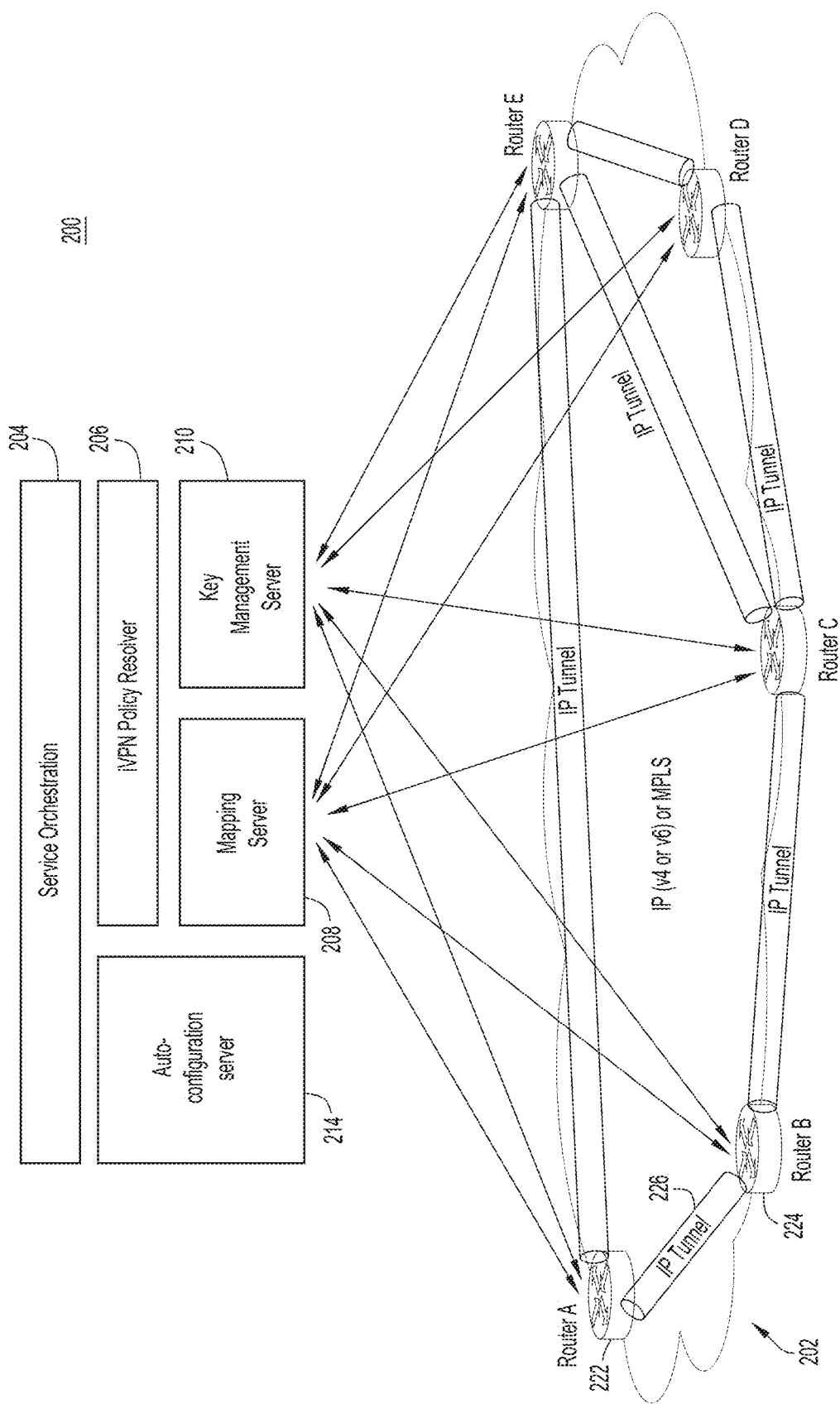

FIG. 3C illustrates security policy in iVPN architecture in accordance with embodiments of the present disclosure. The key management server 210 can maintain the architectural and operational characteristics of a centralized key management (CKM) server. The key management server 210 can extend CKM to allow for VPN gateways to protect traffic with private pairwise IPsec keys, as an alternative to using a group key for all VPN gateways.

The Mapping Server 208 and CKM KMS 210 work together in specifying and enforcing a specific security policy. Mapping Server 208 defines authorized overlay connections. The CKM KMS 208 defines the keying material and cryptographic policy used between authorized VPN gateways.

Figure 3D:
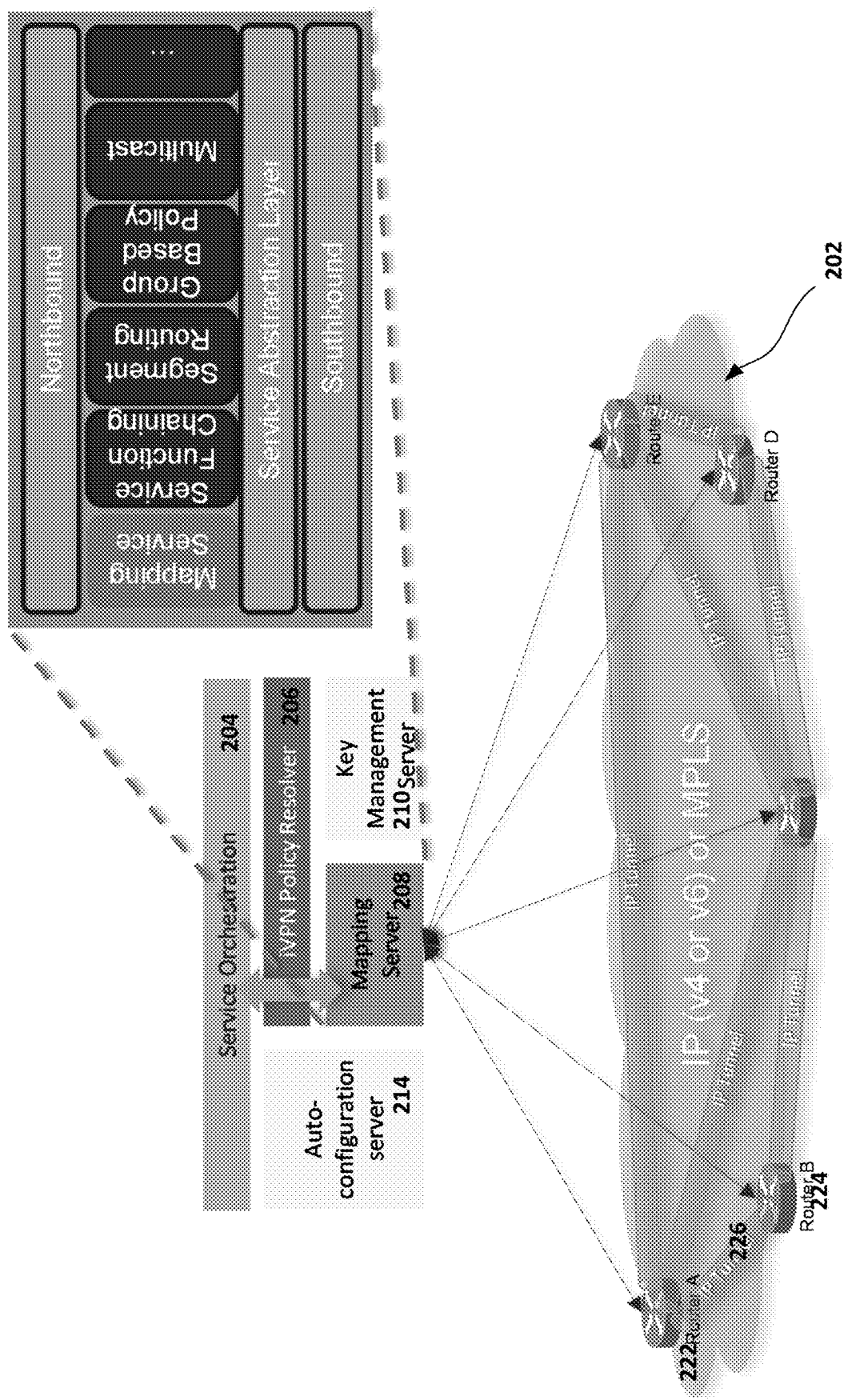

FIG. 3D illustrates policy-based forwarding in accordance with embodiments of the present disclosure. The orchestrator 204 pushes forwarding policies to the policy resolver 206 via abstracted NBI. The policy resolver 206 resolves policies to forwarding state and pushes resulting forwarding state to mapping server 208. The mapping server 208 serves resolved forwarding state to CPE (e.g., using LISP).

Figure 4:
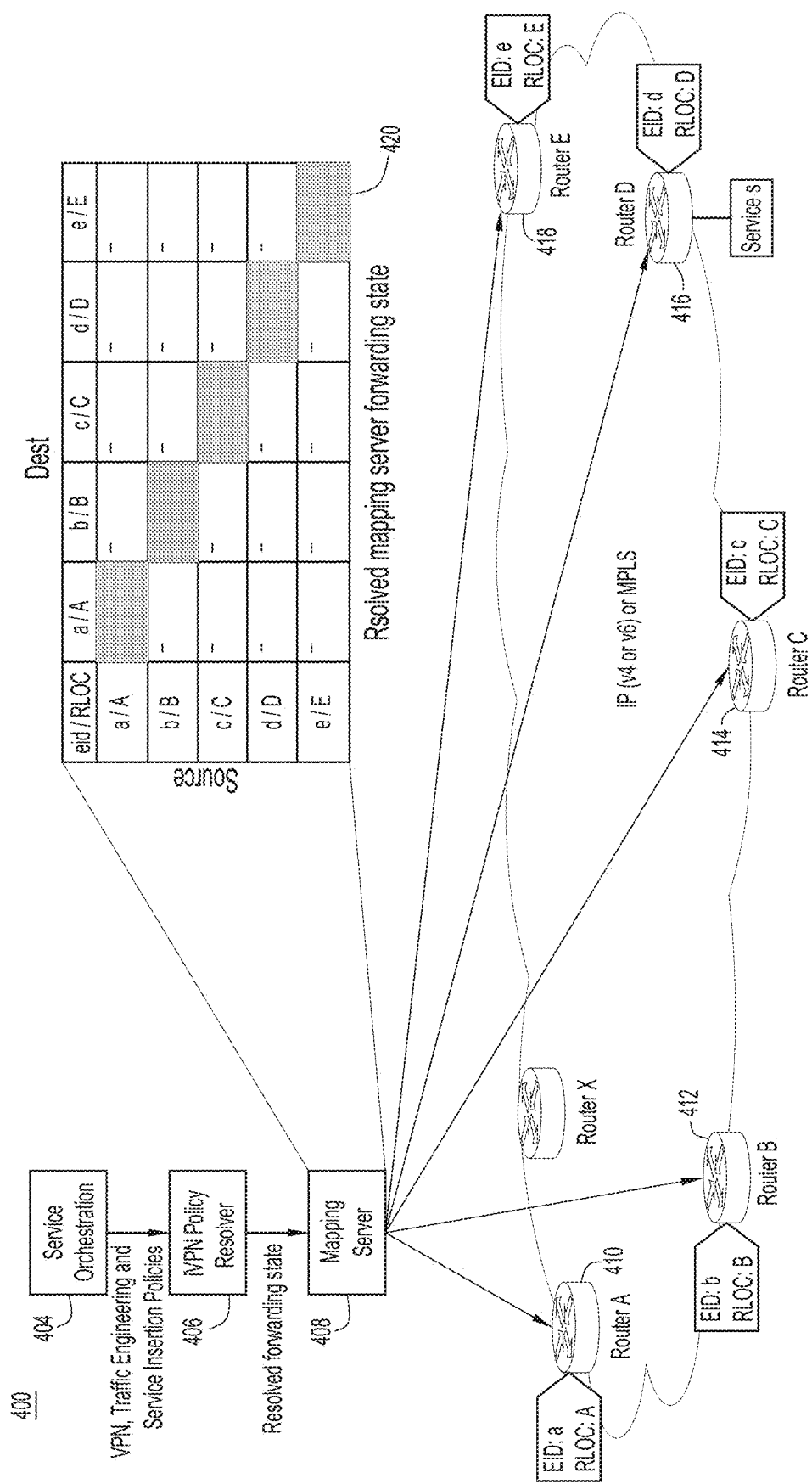
FIG. 4 is a schematic diagram 400 of a mapping server 408 in accordance with embodiments of the present disclosure.

FIG. 4 is a schematic diagram 400 of a mapping server 408 in accordance with embodiments of the present disclosure. Mapping server 408 can maintain a mapping table 420. Mapping table 420 includes a mapping between source eid (endpoint ID) and RLOC (routing locator) values to destination eid and RLOC values. The service orchestrator 404 can provide policies for how source and destination forwarding states should be applied on a per VPN basis or on a per tenant basis (or both). The VPN policy resolver 406 can resolve forwarding state information for mapping server 408. The mapping server 408 can program the mapping table via a northbound interface exposed to the orchestrator 404.

An RLOC is an IPv4 or IPv6 address of an egress tunnel router (ETR). A RLOC is the output of an EID-to-RLOC mapping lookup. An EID is an IPv4 or IPv6 address used in the source and destination address fields of the first (most inner) LISP header of a packet.

Figure 5:
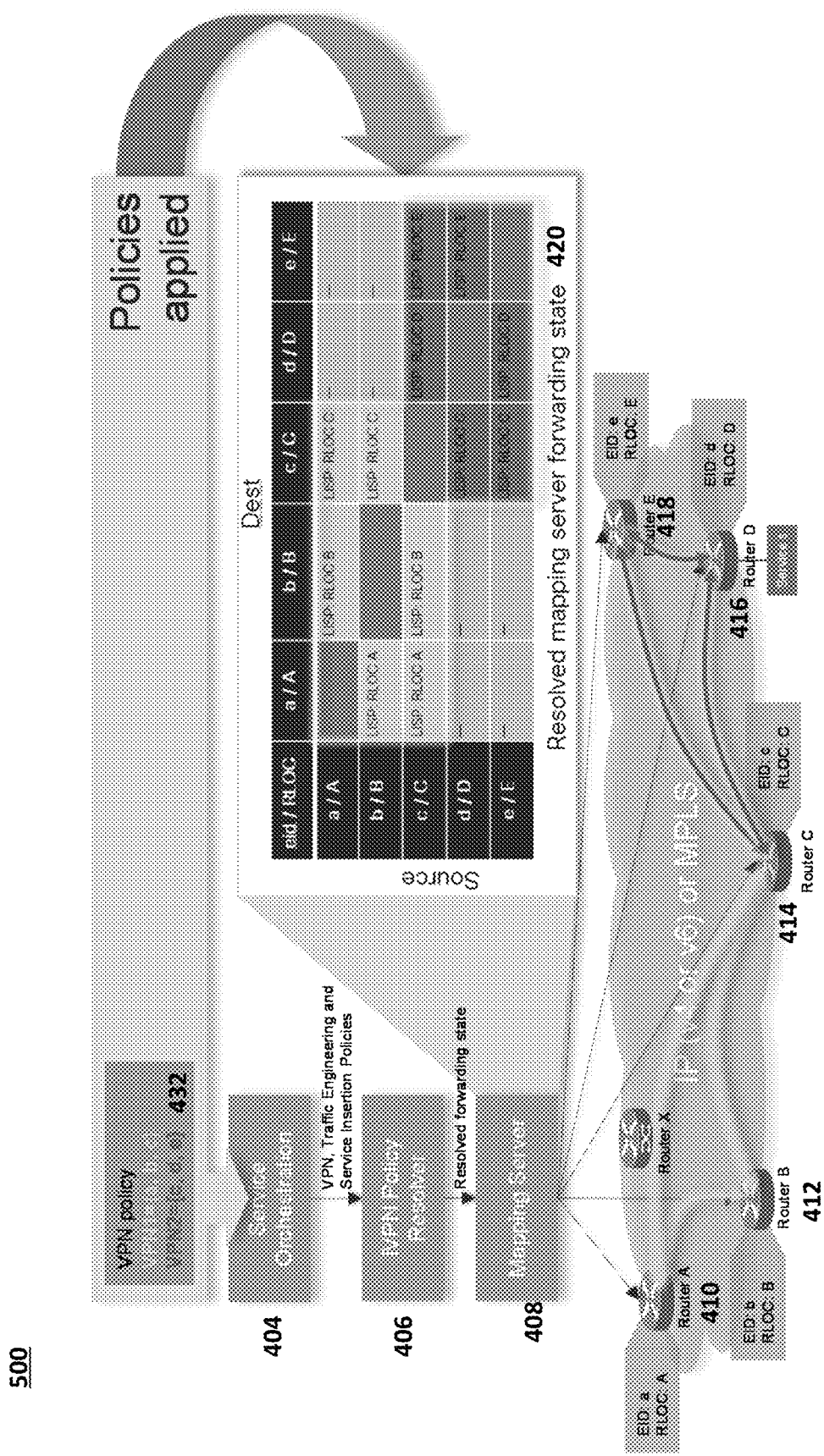
FIG. 5 illustrates an example policy resolution for resolving forwarding states of two example VPNs.

FIG. 5 illustrates an example policy resolution for resolving forwarding states of two example VPNs: VPN1={a,b,c} and VPN2={c,d,e}. VPN Policies 432 can be applied by the mapping server to map forwarding state for sources and destinations. For example, for VPN1={a,b,c}, router A 410 can have an eid "a" and RLOC "A," router B 412 can have an eid "b" and RLOC "B," router C 414 can have an eid "c" and RLOC "C." For VPN1={a,b,c}, a source router can be mapped to a destination router based on the RLOC of the destination router. Likewise for VPN2={c,d,e}. Router D 416 can include eid "d" and RLOC "D," and router E can include eid "e" and RLOC "E."

Noteworthy is that router c can be used by both VPN1 and VPN2.

Figure 6:
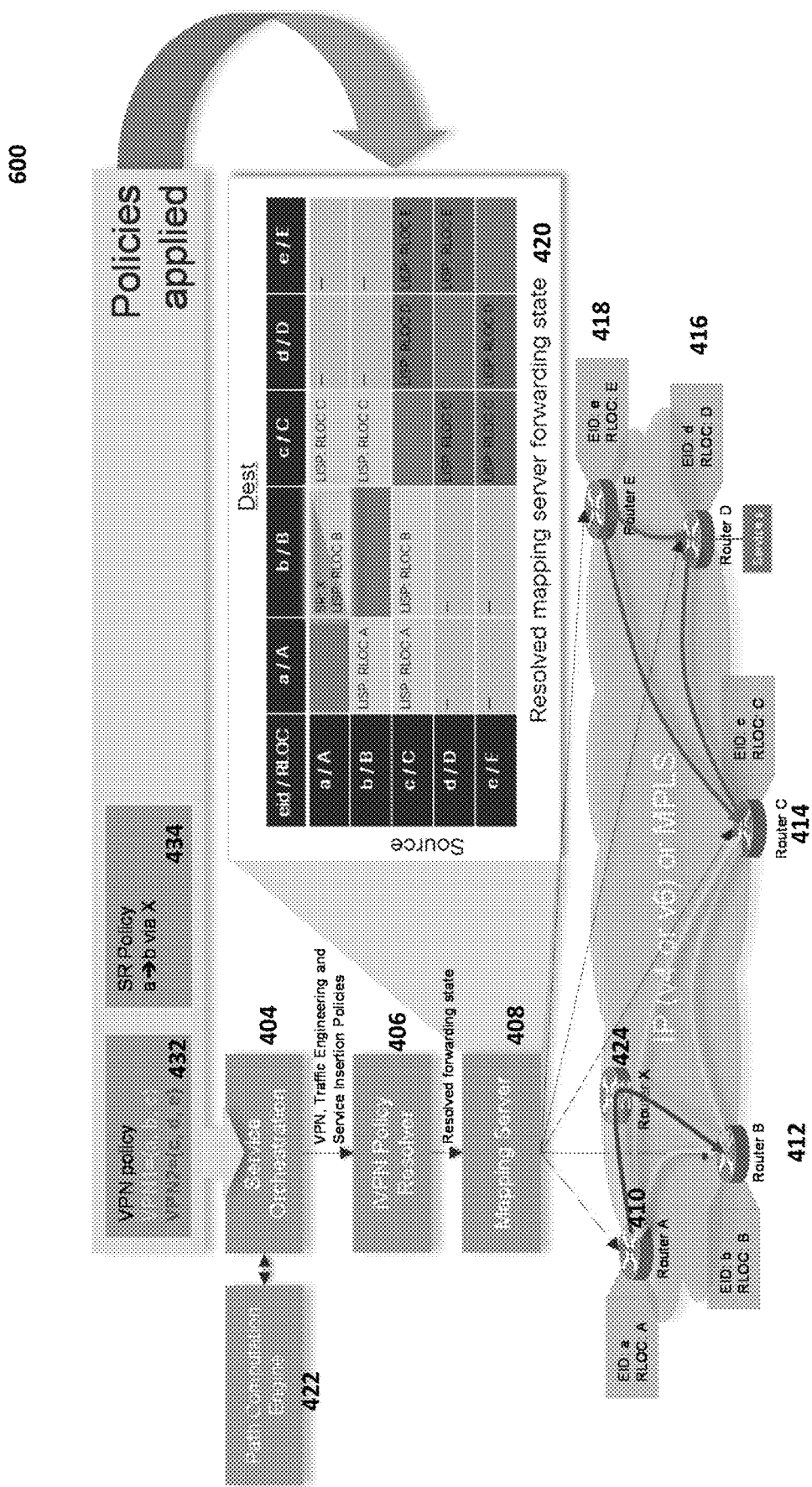
FIG. 6 illustrates a path computation engine 422 for identifying traffic paths in accordance with embodiments of the present disclosure.

FIG. 6 illustrates a path computation engine 422 for identifying traffic paths in accordance with embodiments of the present disclosure. The path computation engine 422 can derive traffic paths that are compliant with VPN policies and security concerns. The service orchestrator 404 can apply SR policies 434. The mapping table can include an additional field (SR field) that indicates routers that can be used as intermediate path hops between a source router and a destination router. For example, router X 424 can be an intermediate router used to route traffic between source router A 410 and destination router B 412. Router X 424 is identified in mapping table 420 as an intermediate router from A to B.

The mapping server 408 can receive a request from a router 410 that is attempting to reach another router 412. The request can include the RLOC of the requesting router 410. The mapping server 408 can apply a policy associated with the router 410 to use router x 424 as an intermediate hop router between router A 410 and router B 412.

Figure 7:
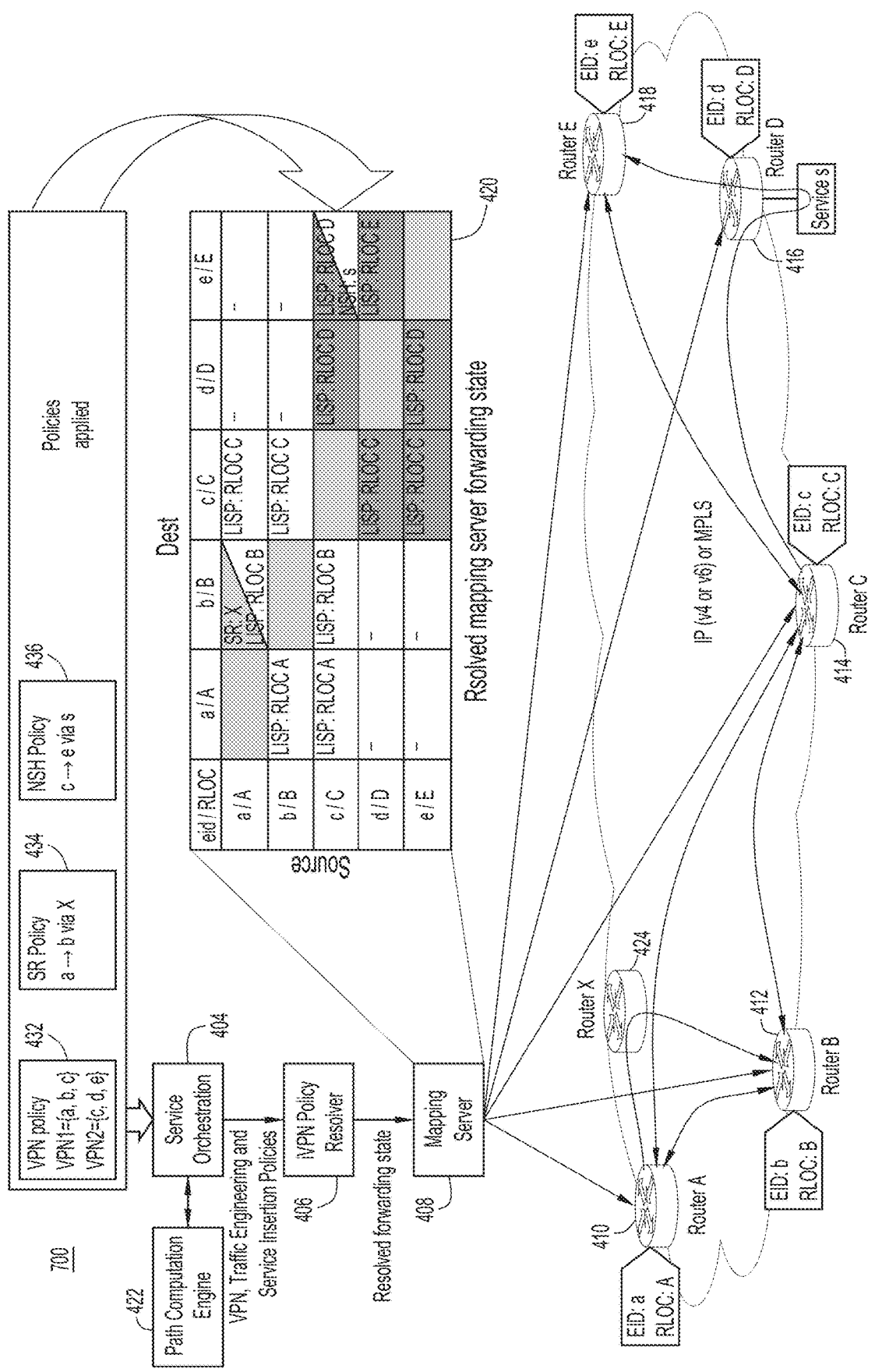
FIG. 7 illustrates the application of a network service header to the VPN mapping.

FIG. 7 illustrates the application of a network service header (NSH) to the VPN mapping. The mapping table 420 can include a network service header identifier, such as a SPI or SI value as part of a source-destination mapping entry. The network service header can be applied to traffic packets when the route determination is calculated. As traffic is routed (in this example, from router C 414 to router D 416), the indication of a network service header SPI or SI can cause the router (or a service function forwarder) to forward the packet to a service prior to routing the packet to its final destination (in this example, to router 418).

Figure 8:
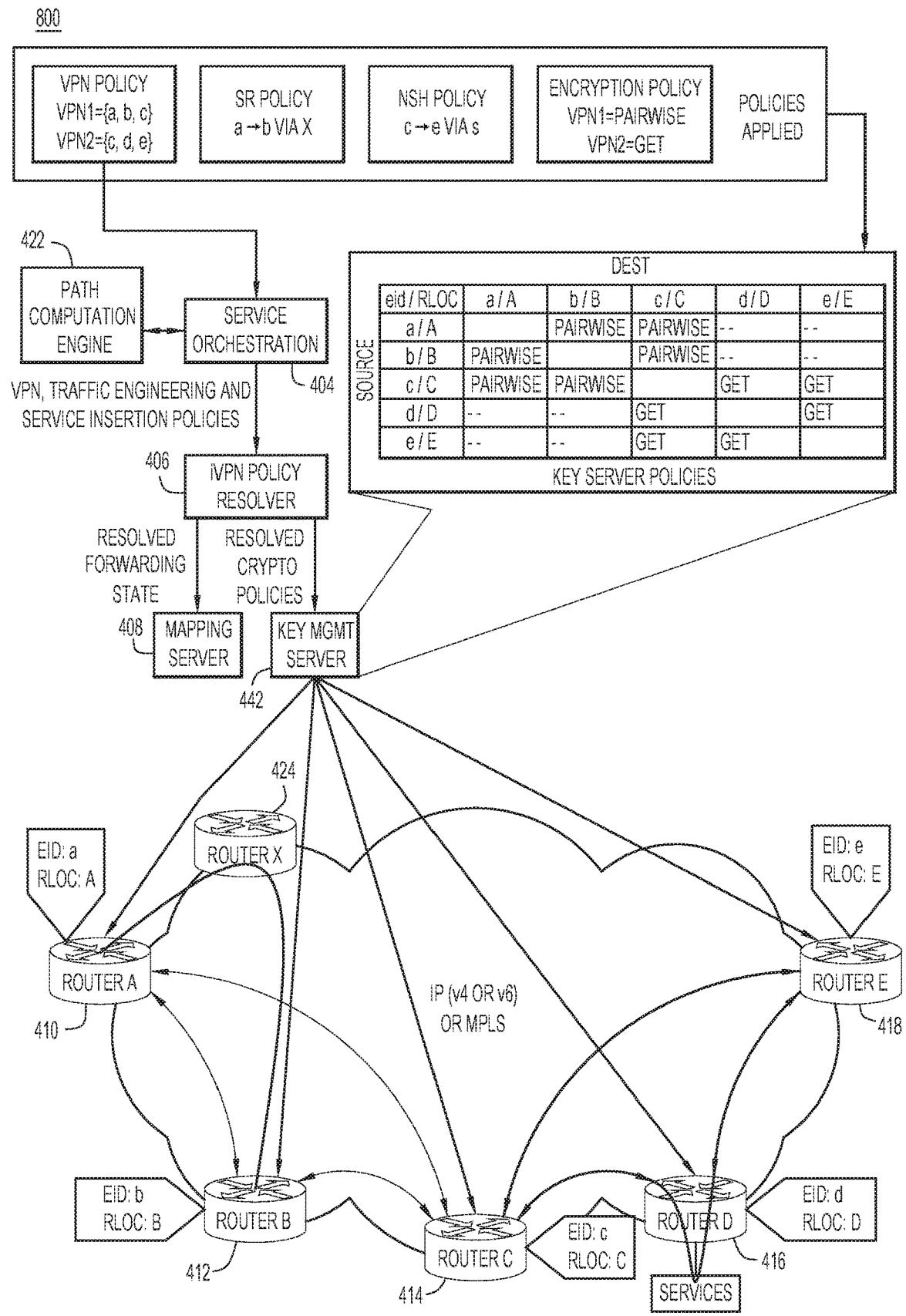
FIG. 8 illustrates the application of encryption policies for VPNs in accordance with embodiments of the present disclosure.

FIG. 8 illustrates the application of encryption policies for VPNs in accordance with embodiments of the present disclosure. Encryption can have various attributes that can be applied on a VPN basis or a tenant basis or both. For example, in FIG. 8, a "pairwise" encryption policy is applied for VPN1, and a "GET" encryption policy is applied for VPN2. The encryption attributes can be reflected in the mapping table 440. Mapping table 440 can be maintained by the key management server 442. The mapping table 440 can indicate the type of encryption policy that is required for a VPN or between a particular source and destination.

Figure 9:
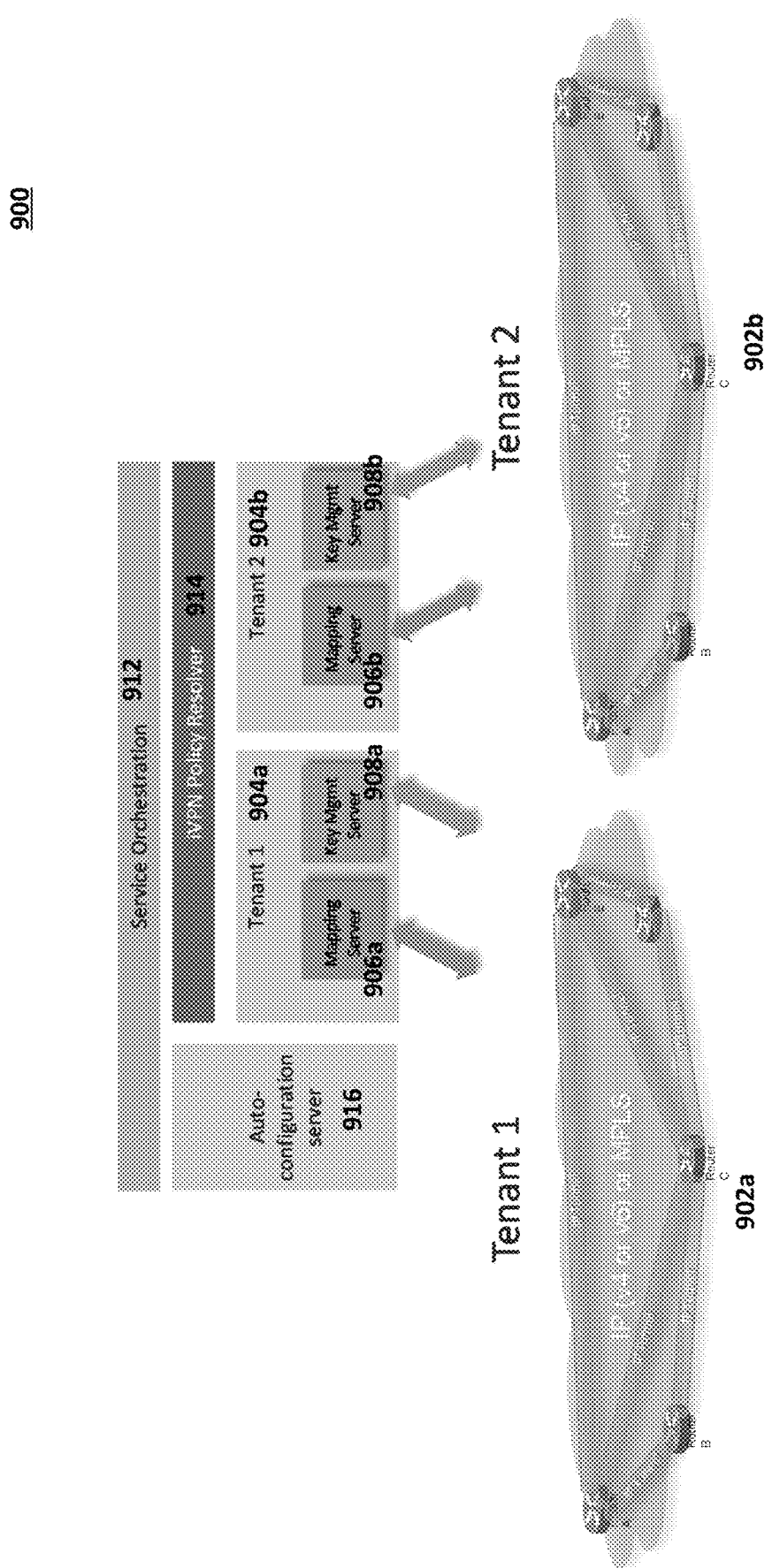
FIG. 9 is a schematic diagram illustrating a multitenant overlay in accordance with embodiments of the present disclosure.

FIG. 9 is a schematic diagram of multi-tenancy overlay topology 900 in accordance with embodiments of the present disclosure. In FIG. 9, overlay topology 900 includes a service orchestrator 912, an iVPN policy resolver 914, and autoconfiguration server 916, as described above.

The overlay topology 900 can support multi-tenancy applications, such as supporting tenant1 902*a* and tenant2 902*b*. The overly topology 900 can support a first partition for tenant 1 904*a* that includes a mapping server 906*a* and key management server 908*a*. The overly topology 900 can support a second partition for tenant 2 904*b* that includes a mapping server 906*b* and key management server 908*b*.

Multitenancy can be achieved by having separate Mapping Servers and Key Management Servers per tenant. Tenant forwarding state and Key Management State is completely isolated between tenants. Service orchestration 912 can support multitenancy; autoconfiguration server 916 and iVPN policy resolver 914 are tenant agnostic. The service orchestration 912 can support multitenancy by pushing abstracted service policies (VPN, SR and NSH) to the mapping server for each tenant.

Part II. Generic Mapping
Overview

Aspects of the present disclosure provide various method for smart mapping between the overlay and the underlay networks.

As will be appreciated by one of ordinary skill in the art, aspects of the present disclosure, in particular the functionality of the mapping system described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded to the existing devices and systems (e.g. to the existing network elements such as the existing routers, switches, various control nodes, etc.) or be stored upon manufacturing of these devices and systems.

Embodiments of Overlay Networks

Overlay networks in general, and Internet protocol ("IP") overlay networks in particular, are gaining popularity for providing virtual machine ("VM") mobility over Layer 2 ("L2") and Layer 3 ("L3") networks. Virtual eXtensible Local Area Network ("VXLAN") is a technique for providing an L2 overlay on an L3 network, while Locator/ID Separation Protocol ("LISP") is a technique for providing an L3 overlay on an L2 network. In particular, VXLAN and LISP may be used to address the need for overlay networks within virtualized data centers accommodating multiple tenants. In such overlay networks, native frames are encapsulated with an outer IP overlay encapsulation, e.g. along with a VXLAN header, and UDP header.

In VXLAN, each overlay is referred to as a VXLAN segment. VMs within the same VXLAN segment are within the same L2 domain. Each VXLAN segment may be identified by a 24-bit segment identifier ("ID"), referred to as a VXLAN Network Identifier ("VNI"), which identifies virtual network segments for different tenants and allows up to 16M VXLAN segments to coexist within a single administrative domain. The term "VXLAN segment" herein may be used interchangeably with the term "VXLAN overlay network." A VXLAN tunnel endpoint ("VTEP") is a hardware or software component that performs VXLAN encapsulation and decapsulation. The IP address used by a VTEP as the source address for VXLAN encapsulation is referred to as the VTEP address. A leaf node, such as a Top of Rack (ToR) switch or router, may host one or more VTEPs, depending on its capability. Additional details are provided in "VXLAN: A Framework for Overlaying Virtualized Layer 2 Networks over Layer 3 Networks" (RFC 7348) (hereinafter "VXLAN RFC"), which is hereby incorporated by reference in its entirety.

LISP is a network-layer-based protocol that enables separation of IP addresses into two new numbering spaces: Endpoint Identifiers (EIDs) and Routing Locators (RLOCs). Similar to VXLAN, a LISP tunnel endpoint ("xTR") is a hardware or software component that performs LISP encapsulation and decapsulation. The term "xTR" refers to the router that is the tunnel endpoint and is used synonymously with the term "Tunnel Router." The IP address used by a xTR as the source address for LISP encapsulation is referred to as the LISP address. Additional details are provided in "The Locator/ID Separation Protocol (LISP)" (RFC 6830) (hereinafter "LISP RFC"), which is hereby incorporated by reference in its entirety.

Exemplary Settings of Network Environments

For purposes of illustrating the techniques described herein, it is important to understand the activities that may be present in a typical network environment. The following foundational information may be viewed as a basis from which the present disclosure may be properly explained. Such information is offered for purposes of explanation only and, accordingly, should not be construed in any way to limit the broad scope of the present disclosure and its potential applications.

One exemplary network in which embodiments of the present disclosure can be implemented may be viewed as a collection of data centers. Another exemplary network in which embodiments of the present disclosure can be implemented may be viewed as a collection of virtual private networks. In each of these settings, a "data center" (DC) or a virtual private network ("VPN") typically refers to a set of network elements, such as e.g. routers, switches, and controllers, as well as hosts connected thereto, that may communicate with one another by routing packets using a common instance of a routing protocol and by referring to certain common metrics to define a routing domain governed by the particular instance of the routing protocol. Typically, the network elements of a DC/VPN are under a single technical administration. Segregation into different DC's/VPNs allows defining administrative authorities and routing policies of different entities, e.g. of different organizations or different parts of a single organization.

Figure 10:
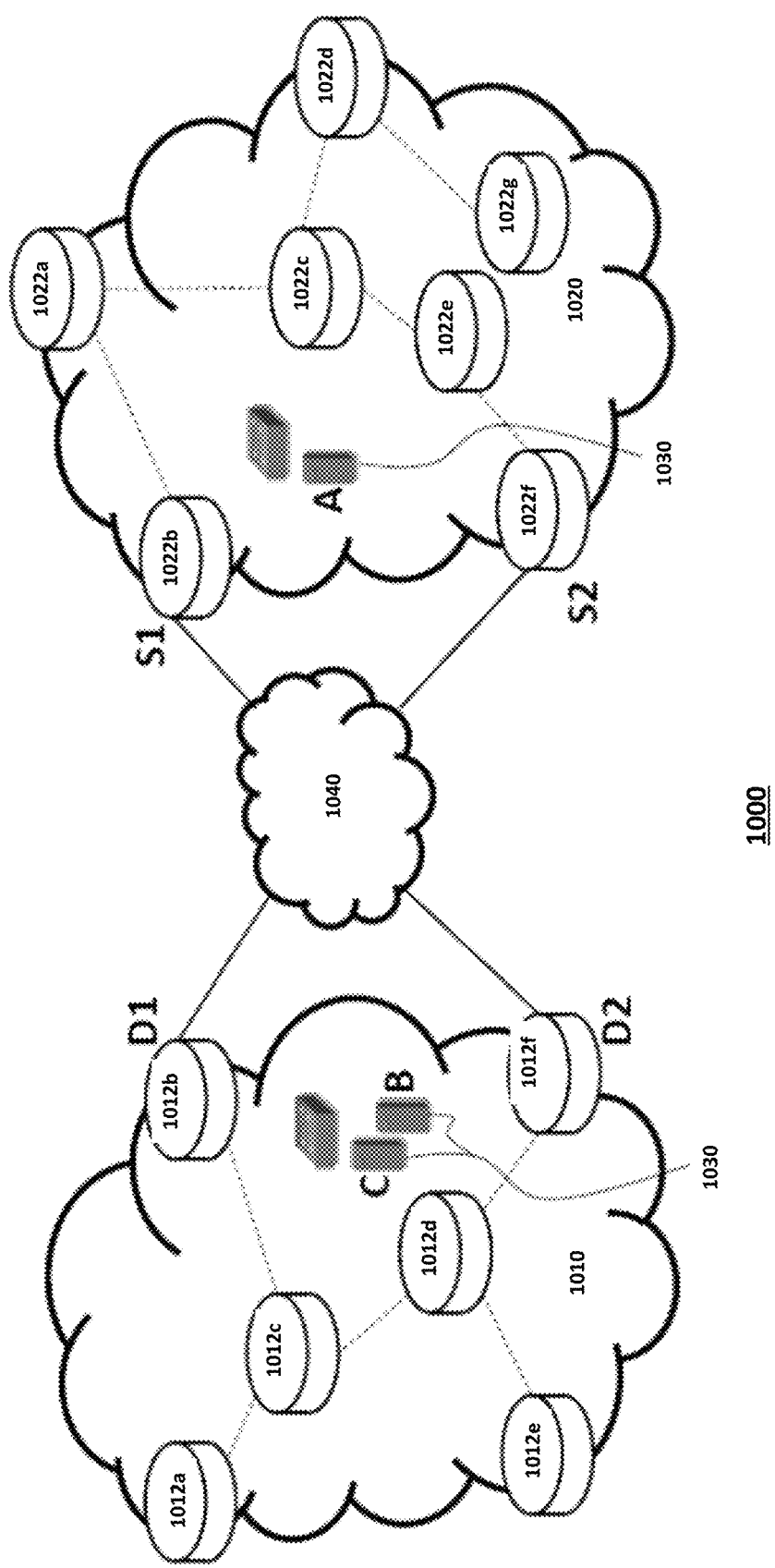
FIG. 10 is a simplified schematic diagram illustrating a network 100 comprising multiple DCs, according to some embodiments of the present disclosure

FIG. 10 is a simplified schematic diagram illustrating a network 100 comprising multiple DCs, according to some embodiments of the present disclosure. While not illustrated in the FIGUREs, the same description provided for FIG. 10 with reference to DCs is applicable to an analogous architecture where, instead of DCs, VPNs are used. Since the description in context of VPNs would be analogous to that in context of DCs provided below, in the interests of brevity, this description is not repeated here.

In the example of FIG. 10, two DC's are illustrated as a first DC 1010 and a second DC 1020. The first DC 1010 includes routers 1012a-1012f, each of which may be operatively coupled to at least one other node within the first DC 1010 as shown with solid lines between some of the routers 1012a-1012f. The lines between some of the routers 1012a-1012f may be viewed to represent exchange of packets according to one or more routing protocols of the first DC 1010.

Similarly, the second DC 1020 includes routers 1022a-1022g, each of which may be operatively coupled to at least one other node within the second DC 1020 as shown with solid lines between some of the routers 1022a-1022g. The solid lines between some of the routers 1022a-1022g may be viewed to represent exchange of packets according to one or more routing protocols of the second DC 1020.

Routers in one DC that are configured to communicate with routers in other DC's are referred to as "edge routers", while routers in one DC that are only configured to communicate with other routes in the same DC are referred to as "core routers." In the illustration of FIG. 10, routers 1012a, 1012b, 1012e, and 1012f are edge routers, while routes 1012c and 1012d are core routers of the first DC 1010, while, for the second DC 1020, routers 1022a, 1022b, 1022d, and 1022f are edge routers and routes 1022c, 1022e, and 1022g are core routers.

Each of the edge routers is configured to communicate, via e.g. external protocol such as e.g. eBGP, with one or more edge routers in another DC. As an illustrative example, the edge routers may be service nodes (e.g. L3VPN, Layer 2 Virtual Private Network (L2VPN) endpoints) that exchange service state via BGP and Label Distribution Protocol (LDP).

In various implementations of embodiments of the present disclosure, a DC may be considered as a physical leaf/spine underlay distributed fabric on which a logical network of hosts is provided as an overlay network. In such implementations, "leaf nodes" may be analogous to what is illustrated in FIG. 10 as edge routers, and "spine nodes" may be analogous to what is illustrated in FIG. 1 as core routers.

Each leaf node in the topology may be a leaf switch that houses one or more network elements, such as e.g. physical servers. Though not illustrated in FIG. 1, a physical server associated with a leaf switch of each leaf node may be housed in a rack unit or "rack." Additional physical servers may also be housed in the rack. Leaf nodes are responsible for managing communications (e.g., routing and forwarding) originating from and destined for physical servers (and virtual machines and virtual switches hosted by the physical servers) in the rack. Hence, a term "top-of-rack" (ToR) is sometimes ascribed to leaf nodes. Each leaf node may act as a gateway from a Layer 2 network of a DC (e.g. Ethernet) onto the fabric 1040 which operates at Layer 3. Therefore, sometimes leaf nodes are also described as "first hop routers" and, in the following, the terms first hop router, edge router, leaf node, and ToR switch may be used interchangeably.

It is appreciated that any number of leaf switches and spine switches may be present in a DC. Furthermore, while a physical leaf/spine topology with tenant overlay networks is used as an example, any network architecture with a physical underlay network and physical and/or logical overlay networks would be consistent with techniques presented herein. In addition, discussions herein are applicable to any IP fabric and presence of the spine nodes is entirely optional. For example, without spine nodes, the leaf nodes could be connected through a full mesh topology.

One or more hosts may be connected to the leaf and/or spine nodes of a DC, shown in FIG. 10 as hosts 1030, in particular as hosts B and C in the first DC 1010 and host A in the second DC 1020, although it is appreciated that any number of hosts may be present in (i.e. connected to) a DC. In various embodiments, a "host" may be or comprise, by way of non-limiting example, any device providing storage, network, or/and computing resource in a data center. Examples of hosts include, but are not limited to, a computer, workstation, server, mainframe, virtual machine (whether emulated or on a "bare-metal" hypervisor), container, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data.

In some embodiments, hosts 130 may include virtual switches and virtual machines ("VMs") that may be created and run on a physical server connected to each leaf node on top of a hypervisor (not shown in the figures). The virtual switches may be configured to manage communications of VMs in particular virtual networks and/or subnetworks ("subnets") and may be embodied by software stored and executed on the corresponding physical server connected to a leaf node, thus performing functions of a physical switch device. Similarly, the VMs may be software stored and executed on the corresponding physical servers connected to the leaf nodes and configured to exchange communications with other VMs. However, embodiments of the present disclosure are not limited to VM hosts and virtual switches. For example, in other typical embodiments, the hosts may include containers and bare-metal workload hosts (i.e. workloads that are not running a VM) that preserve their IP address as the application moves the workloads (example include clustered applications such as oracle RAC, etc.).

The architecture illustrated in the figures and described above applies to both DC and VPN use scenarios, as well as to both L2 (VXLAN) and L3 (LISP) overlay networks described above. In context of VXLAN, devices shown in FIG. 10, such as e.g. D1, D2, S1, and S2, are VTEPs, while, in context of LISP, these devices are xTRs. The architecture illustrated in FIG. 1 further includes a plurality of variously interconnected network elements, e.g. routers, representing an underlay network as well as a mapping system that provides a mapping between the overlay and the underlay networks. Such a mapping system may include a controller configured to program policies into the mapping system, e.g. according to the business policy specified via northbound interface.

Logic for Implementing Functionality of the Present Disclosure

Figure 11:
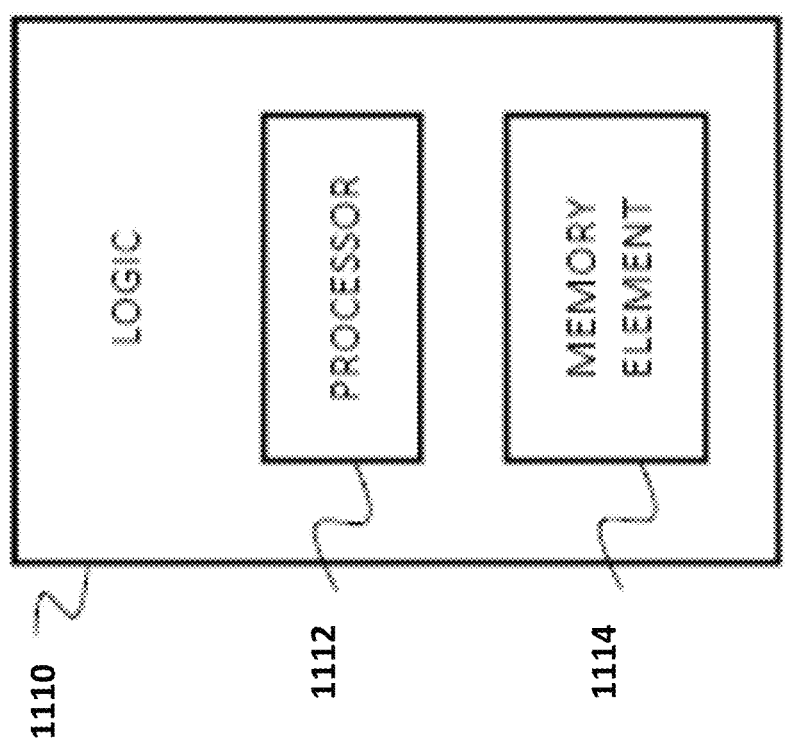
FIG. 11 is a simplified schematic diagram illustrating a logic 1110, according to some embodiments of the present disclosure.

FIG. 11 is a simplified schematic diagram illustrating a logic 1110, according to some embodiments of the present disclosure. As shown, the logic 1110 may include at least one processor 1112 and at least one memory element 1114, along with any other suitable hardware to enable its intended functionality of smart mapping described herein, e.g. the logic 1110 may be configured to implement functionality of the mapping system described herein. Various repositories may be associated with the logic 1110 (not shown in FIG. 11).

Even though the logic 1110 is not illustrated in the network illustrated in FIG. 10, the logic 1110 may be implemented as or in a network element, e.g. a control plane network element, or distributed over a number of network elements of the network 1000. In some embodiments, the logic 1110 may be included within at least some leaf nodes (i.e. first hop routers) of each DC/VPN, e.g. within the leaf nodes D1, D2, S1, and S2. In some embodiments, the logic 1110 may be included within the network 1000.

In various embodiments, elements of FIGS. 10 and 11 may be coupled to one another through one or more interfaces employing any suitable connections (wired or wireless), which provide viable pathways for network communications. Additionally, one or more of these elements of FIGS. 10 and 11 may be combined, divided, or removed from the architecture based on particular configuration needs. Network environment 1000 and logic 1110 may include a configuration capable of transmission control protocol/internet protocol (TCP/IP) communications for the transmission and/or reception of packets in the network. Network environment 1000 and logic 1110 may also operate in conjunction with a user datagram protocol/IP (UDP/IP), any other suitable protocol, or any suitable combination thereof where appropriate and based on particular needs.

Furthermore, in various embodiments, various functionalities described herein may be offloaded to external devices, not specifically described herein.

Problems Associated with Current Mapping Approaches

As previously described herein, LISP is an overlay protocol that enables destination-based forwarding policy by using a mapping system that provides multiple locators (including weights and priorities) to routers. The mapping is used when forwarding packets to a specific destination, and the LISP mapping system described in RFC 6830 is defined to support solely destination-based queries.

However, more sophisticated forwarding policy enforcements are needed by various software defined network ("SDN") applications, e.g. those that are trying to implement source-based mapping or path engineering. In general, a smarter mapping system functionality would perform additional processing on the mapping query and the matched response, in order to provide more intelligent policy-based mappings.

In addition, it would be desirable to make the forwarding policy programmable via the northbound API of an SDN controller or a separate entity, and make the forwarding policy enforcement available to legacy LISP routers, without requiring changes to the on-the-wire LISP protocol.

Embodiments of the Present Disclosure

Embodiments of the present disclosure introduce extensions to the LISP mapping system by which both modern and legacy tunnel routers can be used to enforce advanced forwarding policies, such as hop-by-hop path engineering, two tuple based forwarding, and topology-based forwarding.

Embodiments of the present disclose are based on extending the functionality of the LISP mapping system to perform additional processing on mapping requests, and the associated stored mappings, to enforce advanced forwarding policies without requiring any change to the existing and legacy LISP routers. Below, three examples of additional processing performed by the mapping system (that provides the mapping system more "intelligence" to enforce a more sophisticated forwarding policy) are described.

System Architecture

Current Virtual Private Network (VPN) technologies use distributed network protocols to create VPNs for customers on top of a shared network infrastructure (e.g., either Multiprotocol Label Switching (MPLS) or Internet Protocol (IP) based) that interconnects Customer Premises Equipment (CPE). MPLS-based VPNs are mature and offer a rich set of VPN features and functionality such as, for example, support for complex VPN topologies. These complex VPN technologies can be used in combination with Traffic Engineering (i.e. Resource Reservation Protocol-Traffic Engineering (RSVP-TE) or Segment Routing) or service chaining technologies (i.e., Network Service Header (NSH)). However, these are independent technologies with no explicit integration. Therefore, when these technologies are used together, a higher level orchestration system is required to configure the separate technologies so that they work in concert in order to create end-to-end services. In practice, the creation of the higher level orchestration system can be very complicated, with each technology having different dependencies requiring separate configuration, which may in turn impact different devices. As a result, in conventional arrangements, these technologies are generally not used in concert, but instead are deployed and operated independently. This independent operation limits the ability of a network operator (Service Provider) to exploit the value of the underlying networks and services.

Despite their richness of features and functionality, Service Provider (SP) virtual private networks built on MPLS are being challenged today because they are perceived as complex, slow to provision, difficult to manage, and expensive. The distributed network protocols are further challenged to scale to the aggregated number of routes across the VPNs of the service provider's tenants. Additionally, since VPN services are virtualized and separated from the underlying transport, the hierarchical functional decomposition of MPLS VPNs (e.g., customer edge (CE), provider edge (PE), and/or Provider (P) components) has been aligned to the physical network hierarchy. However, this hierarchy is no longer required and instead incurs cost and complexity and is not well suited to deliver, for example, VPN as a Service (VPNaaS).

CPE-to-CPE IP overlay VPNs potentially offer the lowest cost solution because such configurations remove the need for any service aware routers at the core and edge of the network (i.e., at the PE and P routers). However, there are no CPE-to-CPE overlay VPN control plane/data plane solutions which provide the functionality and scale needed for Service Providers to meet enterprise requirements. Furthermore, IP overlay VPNs today treat the Service Provider underlay network as a simple (i.e., "dumb") transport, which limits the ability to exploit the value of the underlying networks and services. That is, the underlying networks/services do not have an understanding of, or integration with, the Segment Routing. In conventional practical arrangements, different VPN technologies are applied in different market segments (e.g., MPLS VPNs in enterprise, Dynamic Multipoint VPNs (DMVPNs) in Small and Medium enterprises (SMEs), hub/spoke Internet Protocol Security (IPsec) in Small and Medium Businesses (SMBs), etc.).

As such, presented herein is a new edge-to-edge IP Overlay Layer 2 (L2)/Layer 3 (L3) VPN system architecture and associated techniques that integrate VPN policy, Traffic Engineering (i.e., Segment Routing) policy, and service insertion policy (NSH). The VPN system architecture and associated techniques, which are sometimes collectively and general referred to herein as is "iVPN," utilize a centralized control infrastructure as the single policy control point for all network services. In general, iVPN leverages and enhances the Locator/ID Separation Protocol (LISP) Architecture and uses Centralized Key Management (CKM).

In general, iVPN provides functionality similar to MPLS VPN on a lower cost base, scales horizontally, and can meet the combined service provider requirements of Enterprise (i.e., full feature), SME, SMB and consumer (i.e. full scale) use cases. iVPN further provides the agility and simplified centralized management of, for example, Software-Defined WAN (SD-WAN) solutions, while providing enterprise class security and encryption, and enabling the network operator to exploit the value of the underlying networks and services through the integration of the VPN policy, Traffic Engineering, and service insertion policy. iVPN may also operate over heterogeneous IP or MPLS networks, is based on open standards and open source software, is well suited to virtualization, and provides a VPNaaS platform for delivering higher-order services.

The iVPN system architecture uses a centralized control infrastructure which is realized with the components shown in FIG. 1. These components include an orchestrator, a policy resolver, a forwarding state server, and a key management and crypto server (key management server), each of which are described in greater detail below.

The orchestrator is a cross domain orchestrator that is responsible for instantiating the end-to-end services by pushing abstracted service policies to the policy resolution function. The orchestrator is multitenant and maintains the database of policies that have been applied.

The policy resolution function is the single point for applying policies in the system. The policy resolution function exposes an abstracted northbound interface to the higher level orchestrator and can apply policies that include, for example, VPN connectivity policies, Traffic engineering policies, Service insertion policies, and Crypto and/or Encryption policies. The policy resolution function is responsible for resolving discrete policies to forwarding state, compounding and reconciling overlapping policies, pushing the resulting resolved forwarding state to the forwarding state server, from which it is served to clients, and pushing resolved Crypto and Encryption policies to the Key Management and Crypto Server. The policy resolution function is multitenant and stateless.

The forwarding state server (e.g., LISP mapping server) stores and serves all resolved forwarding state for VPN connectivity, Traffic Engineering (i.e., Segment Routing), and service insertion (i.e., NSH) policies. The forwarding state server is programmed by the policy resolution function. Multiple forwarding state servers may be used for resiliency, scale and multitenancy (i.e., separate servers are used per tenant). Forwarding state is pushed to VPN edge routers using, for example, LISP with appropriate LISP Canonical Address Format (LCAF) extensions, which reflects an enhancement to the LISP.

The key management server stores and serves all crypto and encryption policies and is programmed by the policy resolution function. Multiple key management servers may be used for resiliency, scale and multitenancy (i.e., separate key management servers are used per tenant). Key state is served to VPN edge routers using, for example, The Group Domain of Interpretation (GDOI). As shown in FIG. 1, VPN edge routers are interconnected by IP overlay tunnels established over an underlying IP or MPLS transport network.

One feature of the iVPN system architecture which differentiates iVPN from conventional VPN architectures is the use of the policy resolution function, which is a single point of policy control point for VPN, Traffic Engineering, Service Insertion and Encryption/Crypto policies, and which programs the forwarding state server and key management server. Another feature of the iVPN system architecture which differentiates iVPN from conventional VPN architectures is the use of the forwarding state server (e.g., LISP mapping server) to maintain all forwarding state (i.e., all resolved forwarding state for VPN connectivity, Traffic Engineering, and service insertion policies). A further feature of the iVPN system architecture which differentiates iVPN from conventional VPN architectures is the use of LISP to push forwarding state to the CPE on a policy change using LCAF extensions, in addition to the conventional LISP pull model of operation.

In summary, iVPN is an edge-to-edge IP Overlay L2/L3 VPN system architecture which enhances the LISP architecture to integrate VPN policy, Traffic Engineering (Segment Routing) policy and service insertion policy (NSH), utilizing a centralized control infrastructure as the single policy control point for all network services. iVPN provides functionality similar to that of MPLS VPNs and supports policy based VPN connectivity, such as complex VPN topologies that LISP, DMVPNs, and hub-spoke VPNs do not. For example, LISP, DMVPN, hub-spoke VPN arrangements require policy configuration at CPE, MPLS VPN arrangements require policy configuration at a PE, etc. (i.e., other VPN technologies require policy configuration in multiple places). iVPN also has a minimal cost base (i.e., lower cost base than MPLS VPNs which have dependency on CE/PE hierarchy, MPLS enabled routers etc.). The integration of VPN policy, Traffic Engineering, and service insertion policy (NSH) in iVPN enables the network operator to exploit the value of the underlying networks and services. Conventional VPN architectures lack this integration and rely upon independent Traffic Engineering and Service Insertion. As such, conventional arrangements require a higher level orchestration system to configure the separate technologies so that they work in concert in order to create end-to-end services. In practice, this can be complicated, with each technology having different dependencies that require separate configuration, which may in turn impact different devices. As a result, conventional VPN technologies are generally not used in concert but rather deployed and operated independently. This limits the ability of a network operator to exploit the value of the underlying networks and services.

iVPN also scales horizontally and can meet the combined service provide requirements of Enterprise (i.e. full feature), SME, SMB, and consumer (i.e. full scale) users. All components of the architecture can scale horizontally to address transactional scale. State scale is dealt with by partitioning state per tenant. In contrast, prefix scale is a significant constraint with conventional MPLS VPNs, where distributed routing protocol instances are challenged to scale to the aggregated number of routes across the VPNs of the service provider's tenants. Additionally, hub/spoke VPN and DMVPN arrangements are limited both by the number of routing protocol adjacencies that can be supported as well as the number of prefixes that can be supported. The iVPN system architecture is well suited to virtualization and provides a VPNaaS platform for delivering higher-order services.

Embodiment #1: Two Tuple Source and Destination Policy Enforcement Based on Overlay Address Space In this case, the EID source-destination pair ("SRC-DST") tuple defined in the LISP specifications are used to register a mapping via northbound APIs to a mapping system. Upon receiving a map request message, the mapping system can treat the SRC-DST tuple as an extension of a DST only mapping, by extending the longest prefix match algorithm to include the SRC part of the tuple as well. In various embodiments, the order for the combination can be configurable depending on the deployment characteristics, making the source or the destination the higher half of the more specific address. After finding a match, the mapping system can return the full result, as well as a processed result where the matched mapping is returned as a simple locator. In the latter case, the tunnel router will use the locator for the overlay destination independent of the requesting source for future flows.

Figure 12:
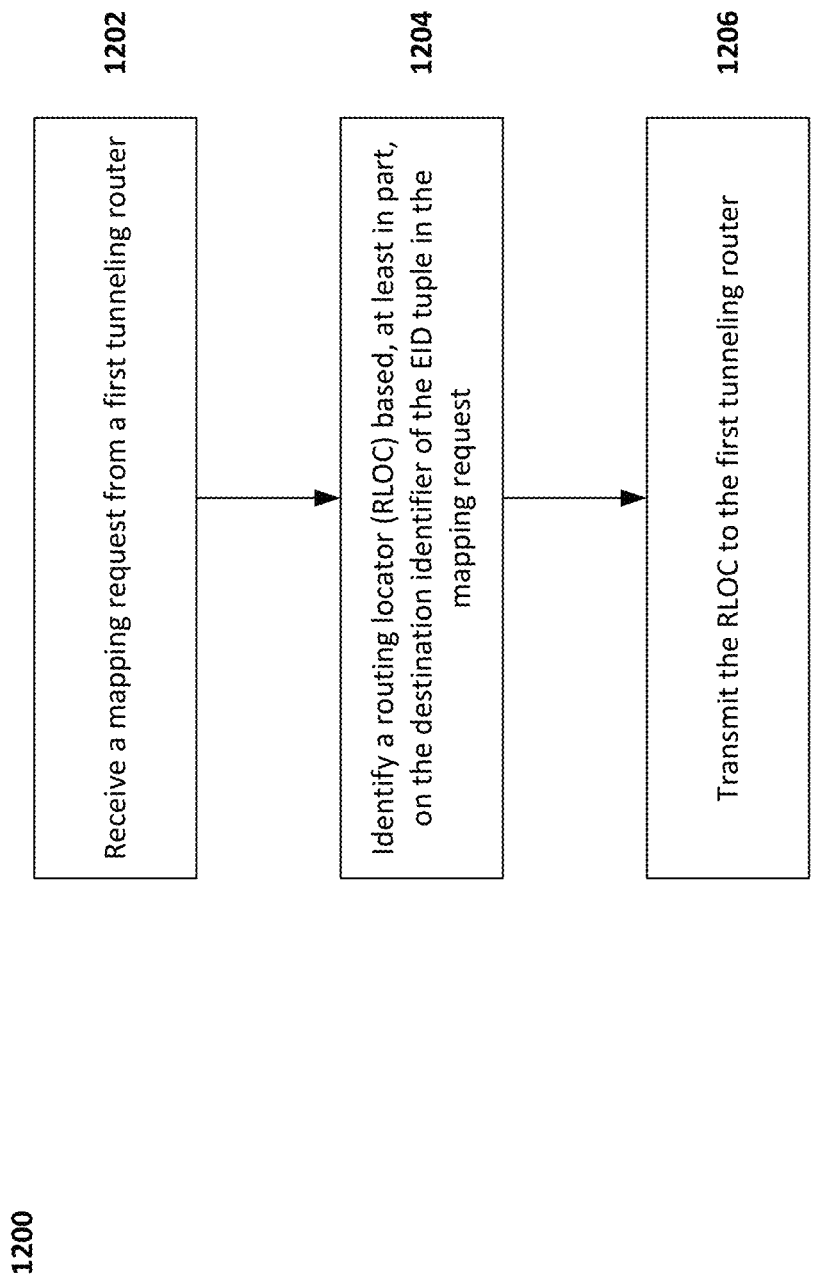
FIG. 12 is a process flow diagram of processing a mapping request that includes a two tuple source and destination policy enforcement based on overlay address space in accordance with embodiments of the present disclosure.

FIG. 12 is a process flow diagram of processing a mapping request that includes a two tuple source and destination policy enforcement based on overlay address space in accordance with embodiments of the present disclosure. A mapping service network element can receive, from a first tunneling router associated with a first virtual network, a mapping request to a second virtual network, the first router compliant with a Locator/ID Separation Protocol (LISP), the mapping request comprising an endpoint identifier (EID) tuple that includes a source identifier and a destination identifier (1202). The mapping service network element can identify a routing locator (RLOC) based, at least in part, on the destination identifier of the EID tuple (1204). The mapping element can transmit the RLOC to the first tunneling router (1206).

Example #2: Two Tuple Source and Destination Policy Enforcement Based on Underlay Address Space In this example, the RLOC SRC-DST tuple defined in the LISP drafts are used to register a mapping via northbound APIs to a mapping system. Upon receiving a map request message, a mapping system can treat the RLOC SRC-DST tuple as an extension of an EID DST only mapping, by extending the longest prefix match algorithm to include the RLOC SRC-DST tuple as well. In various embodiments, the order for the combination may be configurable depending on the deployment characteristics, making the source or the destination the higher half of the more specific address. After finding a match the mapping system can return the full result, as well as a processed result where the matched mapping is returned as a simple locator. In the latter case, the tunnel router will use the locator for the overlay destination independent of the requesting source for future flows.

Figure 13:
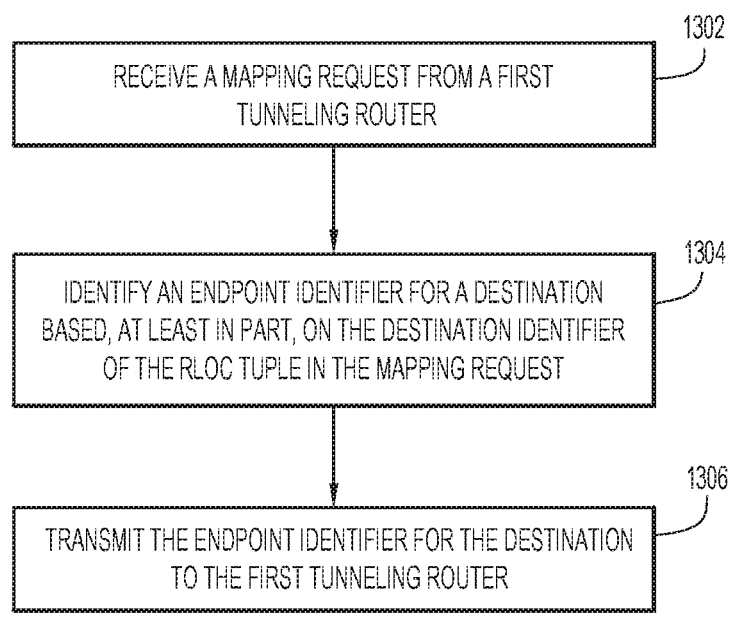
FIG. 13 is a process flow diagram of processing a mapping request that includes a two tuple source and destination policy enforcement based on underlay address space.

FIG. 13 is a process flow diagram of processing a mapping request that includes a two tuple source and destination policy enforcement based on underlay address space. A mapping service can receive, from a first tunneling router associated with a first virtual network, a mapping request to a second virtual network, the first router compliant with a Locator/ID Separation Protocol (LISP), the mapping request comprising an router locator (RLOC) tuple that includes a source identifier and a destination identifier, the RLOC tuple an extension of an endpoint identifier (EID) (1302). The mapping service can identify an endpoint identifier for a destination based, at least in part, on the destination identifier of the RLOC tuple (1304). The mapping service can transmit the endpoint identifier to the first tunneling router.

Example #3: Enabling Path Engineering Using Legacy and Existing Locator ID Separation Protocol Tunnel Routers In this example, a programmable mapping system may be used to enable path engineering using legacy and existing Locator ID Separation Protocol tunnel routers. The programmable mapping system may be configured to expose APIs northbound for registering mappings, potentially in the context of an SDN controller or as a separate entity.

The mapping system northbound API may be used to register a traffic engineering policy using the associated address format. When a router queries a destination via sending a typical map request message, the mapping system may be configured to perform additional processing before returning a mapping reply message as follows: if the associated mapping stored in the mapping system is in traffic engineering format, the mapping system will compare the ITR locator field included in the map request message with the locator address included in each hop of the traffic engineering mapping. If there is a match, the mapping system returns the next hop's locator, as a single locator in a map reply message. If there was no match, the mapping system returns the first hop address as a single locator in a map reply message.

As a result, the correct next hop will be returned to the router requesting to reach a destination, without special support for TE in the router itself.

One consideration for this approach may be that each tunnel router participating in a traffic-engineering path must use a unique ITR locator when building map request messages, and that the same locator is used to define the associated hop in the mapping system. To address this, in various embodiments, routers may be configured to use a specific locator when building map request messages.

Figure 14:
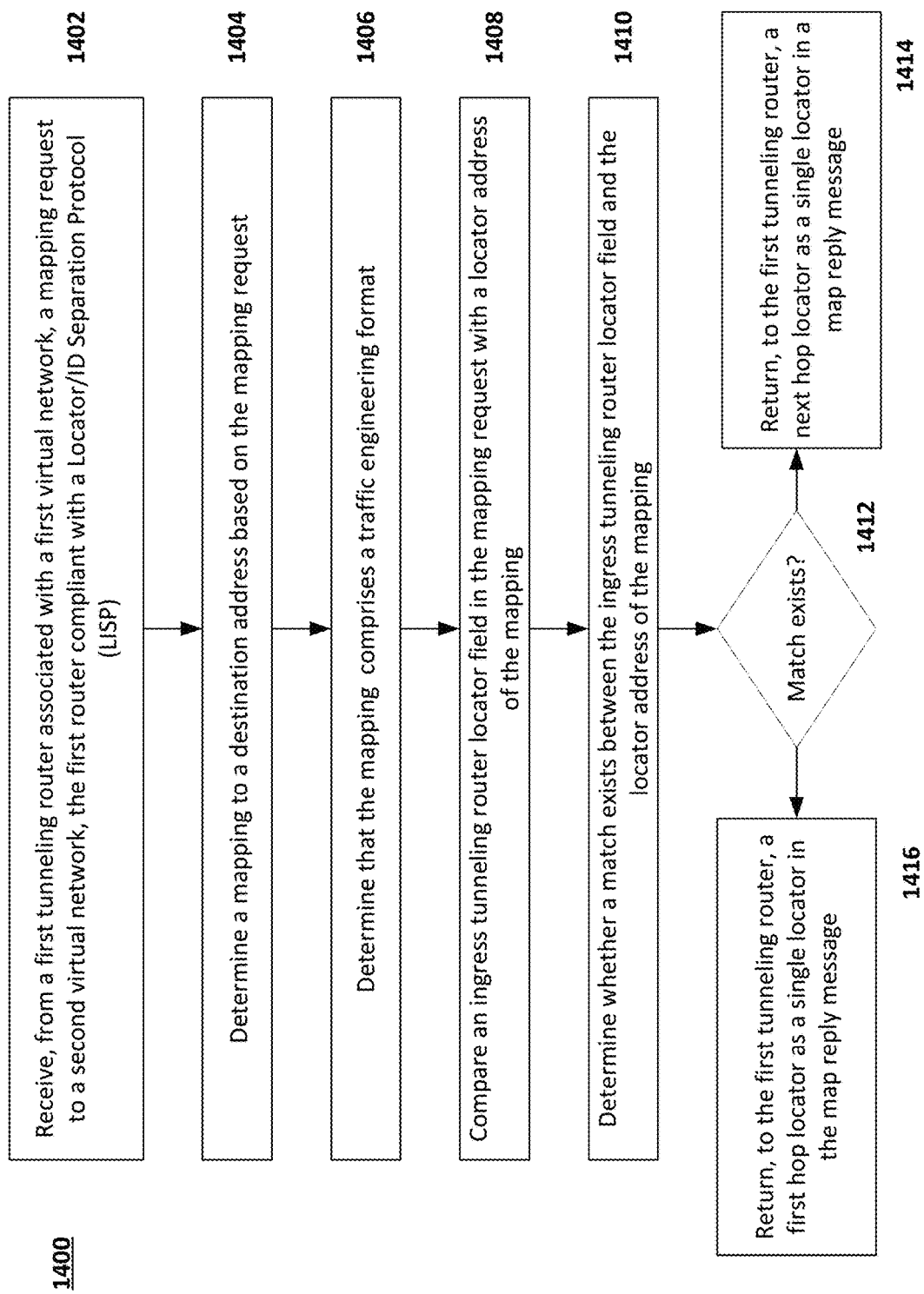
FIG. 14 is a process flow diagram of processing a mapping request that includes enabling path engineering using legacy and existing Locator ID Separation Protocol tunnel routers in accordance with embodiments of the present disclosure.

FIG. 14 is a process flow diagram of processing a mapping request that includes enabling path engineering using legacy and existing Locator ID Separation Protocol tunnel routers in accordance with embodiments of the present disclosure. A mapping service network element can receive, from a first tunneling router associated with a first virtual network, a mapping request to a second virtual network, the first router compliant with a Locator/ID Separation Protocol (LISP) (1402). The mapping service network element can determine a mapping to a destination address based on the mapping request (1404). The mapping service network element can determine that the mapping comprises a traffic engineering format (1406). The mapping service network element can based on determining that the mapping comprises a traffic engineering format compare an ingress tunneling router locator field in the mapping request with a locator address of the mapping (1408). The mapping service network element can determine whether a match exists between the ingress tunneling router locator field and the locator address of the mapping (1410).

If a match exists between the ingress tunneling router locator field and the locator address of the mapping, the mapping service network element can return, to the first tunneling router, a next hop locator as a single locator in a map reply message (1412).

If a match does not exist between the ingress tunneling router locator field and the locator address of the mapping, return, to the first tunneling router, a first hop locator as a single locator in the map reply message (1414).

Techniques described herein allow to enforce advanced forwarding policies in LISP-based networks without any modifications to existing LISP routers, in contrast to the traditional LISP approach that requires feature support in LISP routers to support such policies. Such techniques enable the use of the LISP mapping system in the context of "smart" VPN applications, such as iVPN, where a programmable VPN policy resolver can enforce complex forwarding policies. The iVPN architecture is required to address the growing threat from over-the-top, cloud managed IP-based VPN solutions (a.k.a. Cloud VPN).

Variations and Implementations

While details of certain embodiments of the present disclosure are described with reference to LISP and/or the use case of VPNs, these teachings are equally applicable, with modifications that would be apparent to a person of ordinary skill in the art based on the descriptions provided herein, to VXLAN and/or the use case of DCs. For example, as a person of ordinary skill in the art would readily recognize, references to Locators and EIDs described above are made in the context of LISP. However, as used herein, these terms represent a general notion present in any overlay technology. For example, in a VXLAN implementation, equivalent constructs may be found in the form of VTEPs and Hosts corresponding to RLOCs and EIDs respectively.

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate operations thereof related to the mapping system functionality described herein. This may be inclusive of appropriate algorithms and communication protocols that allow for the effective exchange of data or information.

In one implementation, leaf nodes described herein may include software to achieve (or to foster) the mapping system functionality discussed herein, where the software may be executed on one or more processors to carry out the functions. This could include the implementation of instances of programming logic and/or any other suitable element that would foster the activities discussed herein. Additionally, each of the leaf nodes can have an internal structure (e.g., a processor, a memory element, etc.) to facilitate some of the operations described herein. In other embodiments, these functions for mapping system may be executed externally to the leaf nodes, or included in some other network element to achieve the intended functionality. Alternatively, leaf nodes may include software (or reciprocating software) that can coordinate with other network elements in order to achieve the functions related to the mapping system described herein. In still other embodiments, one or several devices may include any suitable algorithms, hardware, software, components, modules, interfaces, or objects that facilitate the operations thereof.

In certain example implementations, functions related to the mapping system described herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases to enable functions disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the mapping system functionality described herein. Additionally, each of these devices may include a processor that can execute software or an algorithm to perform the mapping system functionality as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of the mapping system functionality, as potentially applied to a myriad of other architectures.

It is also important to note that the steps in the FIGUREs illustrate only some of the possible scenarios that may be executed by, or within, the mapping system described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the mapping system in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

Service Path ID to Overlay Translation for NSH

A Network Service Header (NSH) provides an identifier that is used to select the network overlay for forwarding packets along a service chain. Existing implementations of NSH typically rely on a control plane sending both the NSH information and the overlay information to the participating nodes.

Described herein are systems and methods for creation and utilization of a dynamic mapping/encapsulation locator control plane for NSH service chains by extending the Locator/ID Separation Protocol (LISP) to support NSH-based lookups.

In existing implementations of NSH, there is typically no de-coupling of the service identifiers from the network locators, which places a burden on the service chaining control plane and does not it allow the service chaining control plane to take advantage of scalability and other characteristics of a true locator/identifier mapping architecture. LISP may be used to provide a scalable mapping system and control protocol to create a dynamic overlay network for Internet Protocol version 6 (IPv6) and Internet Protocol version 4 (IPv4) locators and identifiers, but cannot conventionally utilize NSH path information to create a service path.

Various ones of the embodiments disclosed herein include new approaches to both LISP and NSH to create a dynamic service overlay.

In some embodiments, a NSH may provide a Service Path Identifier (SPI) and Service Index (SI) that are used to create a service path. The SPI may identify which path packets are on, and the SI may provide the location within that path.

A classifier may impose NSH based on some local classification policy, and the packets and NSH are then encapsulated in a network transport (e.g., Virtual Extensible Local Area Network (VXLAN), Generic Routing Encapsulation (GRE), LISP) based on the NSH SPI/SI values. Packets may then be directed to a node acting as a Service Function Forwarder (SFF), which uses the NSH values to select the Service Function (SF) required. The SF may decrement the index to indicate that the service was performed. After SF, the NSH may again be consulted to select the needed overlay to the next SFF. These operations may be repeated until the end of the service chain, in which case the original packet is forwarded. In some implementations, each node performing service path selection (e.g., using NSH SPI and SI values) may receive a table from the control plane.

The following illustrates an example of the operations discussed above:

| NODE | SPI/SI | Next-Hop |
|---|---|---|
| Classifier | 10/255 | 1.1.1.1 (SFF1) |
| SFF1 | 10/254 | 2.2.2.2 (SFF2) |
| SFF2 | 10/253 | End of Chain → deliver original packet |

As indicated in the table above, the resolution of SPI/SI to the Next-Hop may be known a priori, and may be relatively static.

In some embodiments, a LISP mapping service stores and provides mappings between endpoint identifiers and their locators (which are typically IPv6 or IPv4 addresses). A control plane protocol, such as the LISP control protocol, can use this mapping system to enable dynamic and on-demand network overlays. For example, upon receipt of a packet, the control plane protocol may be used to query the mapping system for the locator associated with the packet or flow based on existing packet headers and flow fields. Upon receipt of the locators, the packets may be encapsulated to the destination locators. The locators may be cached locally for future use.

Various ones of the embodiments disclosed herein extend the LISP mapping database, and the LISP control protocol, to include NSH SPI and SI as keys, and therefore may enable LISP to return the needed overlay next hop based on the NSH header information for service chain forwarding.

In some embodiments, rather than having a static table pushed to the various NSH nodes (e.g., using the same example discussed above), the node may query the LISP mapping service, which may return the needed next-hop(s). In order to accomplish this, the LISP map-request and map-reply messages may be extended so they include NSH SPI/SI. The mapping database may also be extended to use NSH data as a key for looking up locators, or locator hops belonging to a chain. The mapping database may return the locator(s) for the next SFF(s) for a given NSH hop. In some embodiments, these extensions may be implemented by extending the LISP canonical address formats to include NSH data and service path information.

The coupling of NSH and LISP, in accordance with various ones of the embodiments disclosed herein, may allow NSH to take advantage of the scalability and dynamic nature of the LISP control plane. Examples of use cases include enabling mobility of SFs across SFF nodes, and load balancing and active backup scenarios across a group of SFs distributed across multiple SFFs. Additionally, various embodiments disclosed herein provide an inter-domain control plane for NSH. Embodiments of the techniques disclosed herein are discussed in FIG. 15.

Figure 15:
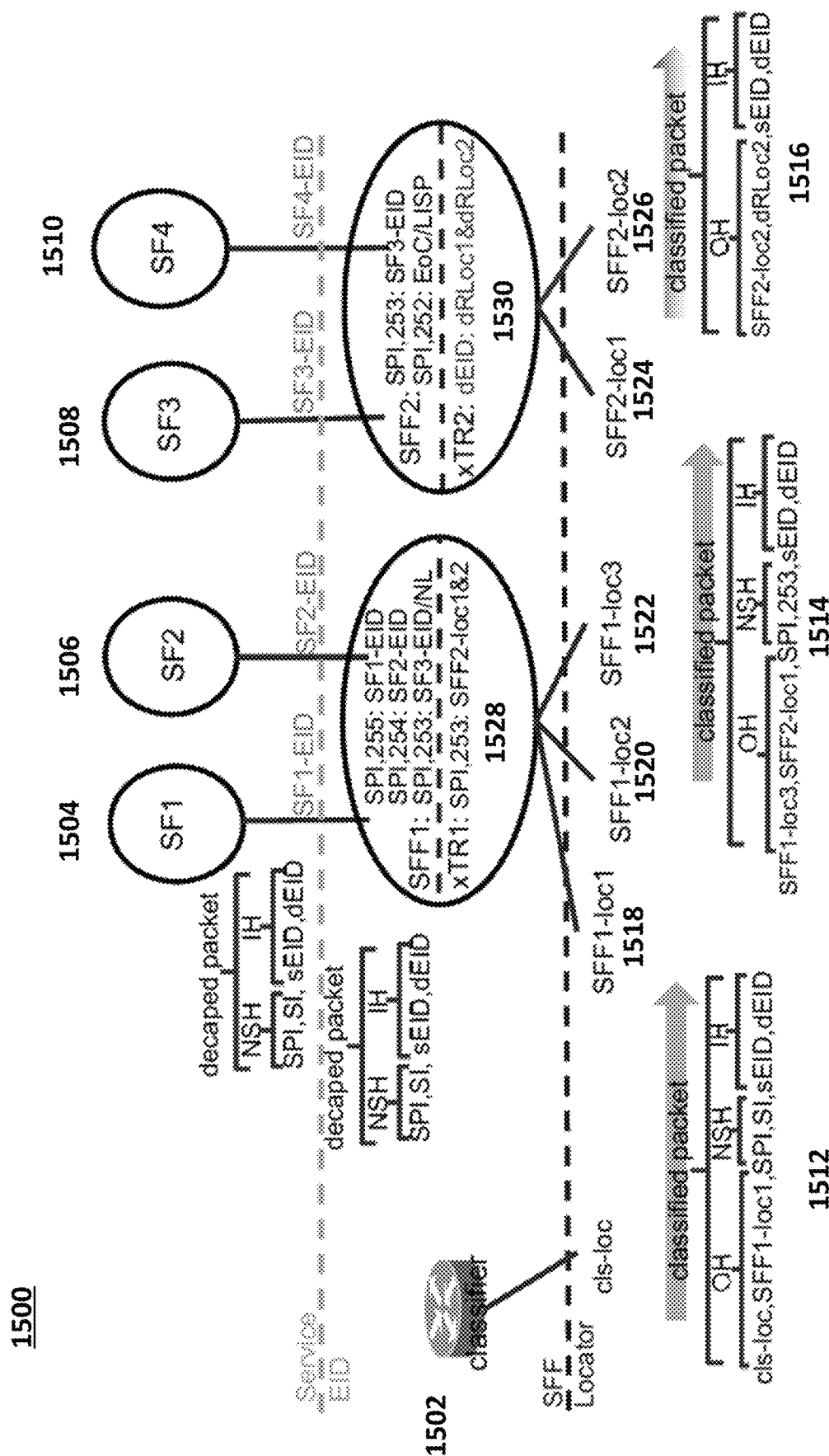
FIG. 15 is a schematic illustration of network service header integration within the LISP control plane in accordance with embodiments of the present disclosure.

FIG. 15 is a schematic illustration of network service header integration within the LISP control plane in accordance with embodiments of the present disclosure. The service chaining packet format includes a network service header, in addition to a LISP generic protocol extension. This disclosure describes using LISP control plane for looking up SPI and SI for identifying next SFF and final RLOCs.

The NSH integration with the LISP CP can be used for SPI forwarding. The service function chain model includes the following:
SFC Model:
a. SF NAME→{SF dp locator+SFF NAME}
b. SFF NAME→{SFF dp locator}
Mapping to LISP Model:
a. SF dp locator: EID space (e.g., SF-EID)
b. SFF dp locator: RLoc space (e.g., SFF-loc)
LISP MS:
a. SF-EID=>list{SFF-loc}
b. SPI=>sequence [SF-EID]

FIG. 15 illustrates an example scenario of service function chaining in accordance with embodiments of the present disclosure. FIG. 15 illustrates a topology 1500 that includes a classifier network element 1502, a first service function forwarder (SFF1) 1528 and a second service function forwarder (SFF2) 1530. SFF1 1528 can forward packets to service function 1 (SF1) 1504 and SF2 1506. SFF2 1530 can forward packets to SF3 1508 and SF4 1510. The classifier 1502 can configure a packet to include a network service header (NSH) and an |IH|$_{[RG1]}$ that can be used by the SFF to forward the packet to one or more service functions or to a next SFF or to an endpoint.

Various ones of the embodiments disclosed herein may have one or more advantages over conventional techniques. For example, some embodiments may include a scale advantage: by leveraging the mapping system, a service chain as disclosed herein may inherit the scalability of the LISP control plane. Some embodiments may include a dynamic behavior advantage, and may provide a dynamic control system that supports functionality such as service function mobility and failures. Some embodiments may include a policy advantage by adding support for path selection policies, such as multiple or weighted next-hops.

In some embodiments, the techniques disclosed herein may be included in a control plane/data plane system for overlay L2 and L3 Virtual Private Networks (VPNs), referred to as "iVPN" herein. As discussed in the embodiment of FIG. 16, iVPN may provide an alternative to over-the-top, cloud managed IP-based VPN solutions (a.k.a. Cloud VPN). In particular, the techniques disclosed herein may be included in an iVPN approach to achieve (1) complex VPN topologies and (2) enterprise class security and key management. These performance features are not achieved by conventional VPNs. The systems and techniques discussed herein may also be implemented outside the context of iVPN.

iVPN is a control plane/data plane solution for overlay L2 and L3 VPNs, which leverages capabilities from LISP, uses ESON for enterprise grade encryption, and which incorporates Traffic Engineering via Segment Routing and service chaining via NSH.

SP VPNs built on MPLS are being challenged today because they are perceived as too complex, slow to provision, difficult to manage and too expensive.

CPE-to-CPE IP overlay VPNs potentially offer solution because they remove the need for any service aware routers at the core and edge of the network (i.e. PE and P routers), however, there are no CPE-to-CPE overlay VPN control plane/data plane solutions which provide the set of functionality needed to meet enterprise requirements. iVPN addresses this gap.

Some example characteristics of the architecture are as follows:
1. CPE-CPE (virtual and physical) based IP overlay VPN solution
2. Leveraging enhanced LISP-based network control plane
   1. Encap does not need to be LISP in some embodiments
   2. Supports "push" in addition to "pull"
   3. The mapping server may be the single control point for all network services; all policies (VPN policies, routing policies, service chaining policies) may be pushed to the mapping server;

4. The Orchestrator pushes abstracted connectivity (VPN) policy, service insertion (NSH) policy and path preference (Segment Routing) policy to the LISP Policy Resolver;
5. The policy resolver:
1. Resolves discrete policies to forwarding state,
2. Compounds and reconciles overlapping policies,
3. Pushes resulting resolved forwarding state to mapping server;
6. ESON security architecture may be used for Enterprise class key management and encryption;
1. ESON is substantially different that GETVPN-addresses the issue of group keys;
2. Group keys are used to integrity protect and provide anti-DoS protection for exchanges that do not exchange keys;
3. Group keys are not required for the data plane.

The benefits of some implementations of iVPN over existing SP VPN solutions include one or more of:
1. Single solution for L2 VPN and L3 VPN that can support the requirements of Enterprise (full function), SME, SMB and residential (full scale);
2. Reduces cost-base for L2 VPN and L3 VPN;
3. More feature rich that existing MPLS-based SP VPN with integrated VPN policy, service insertion policy and path preference at any VPN flow granularity;
4. Can operate over public or private networks: IP or MPLS;
Single policy control point for all network services-simplified orchestration and management;
6. Provides a network platform for delivering higher-order services.

In example implementations, at least some portions of the activities related to the systems and methods for LISP/NSH outlined herein may be implemented in software in, for example, a server, a router, etc. In some embodiments, this software could be received or downloaded from a web server, provided on computer-readable media (e.g., non-transitory computer-readable media), or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

In some example implementations, the systems and methods discussed herein includes network elements or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in some embodiments of the systems and methods described and shown herein, processors and memory elements associated with the various network elements may be removed, or otherwise consolidated such that a single processor and a single memory location are responsible for certain activities. Alternatively, certain processing functions could be separated and separate processors and/or physical machines could implement various functionalities. Accordingly, the systems and methods disclosed herein have a myriad of substitute arrangements, design choices, device possibilities, hardware configurations, software implementations, equipment options, etc.

This includes at least some of the memory elements being able to store instructions (e.g., software, logic, code, etc.) that are executed to carry out the activities described in this Specification. A processor can execute any type of instructions associated with the data to achieve the operations detailed herein. In one example, one or more processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machinereadable mediums suitable for storing electronic instructions, or any suitable combination thereof.

Components of the systems and methods may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by a system could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the computers, modules, components, and elements discussed herein may be combined in various possible configurations, all of which are clearly within the broad scope of this disclosure. In certain cases, it may be easier to describe one or more of the functionalities of a given set of flows by only referencing a limited number of network elements. It should be appreciated that the system discussed herein is readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described herein illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion.

Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in this disclosure to "one embodiment," "example embodiment," "an embodiment," "another embodiment," "some embodiments," "various embodiments," "other embodiments," "alternative embodiment," etc. are intended to mean that any features (e.g., elements, structures, modules, components, steps, operations, characteristics, etc.) associated with such embodiments are included in one or more embodiments of the present disclosure.

Example 1 is a system for network communication, including a mapping service computing device that operates in accordance with an extended LISP protocol to support NSH-based lookups.

Example 2 may include the subject matter of Example 1, and may further specify that the mapping service computing device provides mappings between endpoint identifiers and their locators.

Example 3 may include the subject matter of Example 2, and may further specify that the mapping service computing device provides the mappings to a control plane protocol to enable a network overlay.

Example 4 may include the subject matter of any of Examples 1-3, and may further specify that locators provided by the mapping service computing device are cached locally by a control plane protocol that queries the mapping service computing device.

Example 5 may include the subject matter of any of Examples 1-4, and may further specify that the mapping service computing device is to use NSH SPI and SI as keys to a LISP mapping database.

Example 6 may include the subject matter of any of Examples 1-5, and may further specify that the mapping service computing device returns a next-hop to a querying control plane protocol.

Example 7 may include the subject matter of any of Examples 1-6, and may further specify that the mapping service computing device is to extend the LISP canonical address formats to include NSH data and service path information.

Example 8 may include the subject matter of any of Examples 1-7, and may further specify that the mapping service computing device is included in an iVPN system.

Example 9 is a control plane computing device to communicate within the systems of any of Examples 1-8 to support an extended LISP protocol with NSH-based lookups.

Example 10 is one or more computer-readable media having instructions thereon that, in response to execution by one or more processing devices of an apparatus, cause the apparatus to perform any of the methods performed by the mapping service computing device of Examples 1-8, the control plane computing device of Example 9, or any of the other methods disclosed herein.

Example 11 is a method of utilizing an extended LISP protocol to support NSH-based lookups in accordance with any of the methods disclosed herein.

Overlay-Based Security Group Policies

Embodiments of the present disclosure introduce a system and a methodology for definition and enforcement of group-based policies in network overlays by leveraging and enhancing the LISP/VXLAN control plane. To that end, a programmable mapping system is used to define and enforce network policy groups of granularity of up to 6 tuples. Supported actions for such policies include, but are not limited to, drop, forward natively, encapsulate-to-address, hop-by-hop path, Segment routing, and Service chaining. As previously described herein, LISP defines a pull based lookup mechanism where VTEPs query a mapping system for mappings of overlay to underlay address space. Typically, a mapping system is used to store and return such mappings per request, without additional processing.

Embodiments of the present disclosure provide a programmable mapping system to be a mapping system that exposes APIs northbound for defining mappings that include security group based policies. Such a mapping system can exist potentially in the context of an SDN controller or as a separate entity. In some embodiments, security groups can be defined and matched against to up to tuple flows. These include source and destination L2 or L3 addresses, source and destination port ranges, as well as transport protocol and IP ToS or flow label.

In some embodiments, actions that can be supported include: drop, forward natively, encapsulate-to-address, hop-by-hop path, Segment routing, and Service chaining.

In some embodiments, the northbound API to the programmable mapping system can be used to program such security groups and associated actions as intent-based mapping policies in the LISP mapping system. The mapping system function may be extended to enable additional processing in order to enable desired security group matching and return only the associated action to the matched security group.

Querying VTEPs may pull these mappings on demand. A VTEP then will process the packet according to this returned mapping, enforcing the mapping action on the associated flow. To avoid loss of northbound-defined policies, the mapping registrations from the VTEPs may not overwrite the northbound-defined mappings. As a result the mapping system has to store the two mappings (southbound and northbound) separately. In some embodiments, a priority factor may be defined to configure the mapping system to prioritize the northbound mappings over the southbound mappings when performing the matching algorithms.

Algorithms for matching a query against existing security groups can be predefined in a mapping system, or programmable via northbound APIs.

Compared with data plane based solutions such as e.g. SGT/EPG, techniques described herein may have the significant advantage of not requiring an explicit group tag, that in many hardware implementation wo 5 uld require ASIC changes, and limits adoption to those platforms that support explicit tagging.

Compared with control plane based solutions such as e.g. TrustSec SXP, techniques described herein do not rely on implementing the GBP specific control plane agent in the policy enforcing points. Instead, techniques described herein rely on the overlay control plane that is already supported by the VTEPs (LISP in the example above). This does not require upgrade of the VTEP's software, and facilitates broader adoption.

Techniques described herein may become a key piece of iVPN solutions. In a typical iVPN deployment, a broad variety of VTEPs/CPEs is expected, of which only a subset may support explicit tagging for group based policy enforcement. iVPN is a solution required to address the growing threat from over-the-top, cloud managed IP-based VPN solutions (a.k.a. Cloud VPN). In the SP segment, VPNs are challenged by overlay CPE-to-CPE VPN solutions. The SP Escape Velocity analysis concluded that a CPE-CPE overlay VPN solution is likely to succeed if it provides support for enterprise feature set requirements which include: (1) complex VPN topologies, (2) enterprise class security and key management, and (3) differentiated SLAs. The current VPN solutions do not support this set of requirements, whereas techniques described herein may be used as part of the iVPN solution to at least address requirements (1) and (2).

Integrate LISP/VXLAN and Segment Routing for Topology-Aware Overlays in the DataCenter LISP and VXLAN are key overlay networking technologies for data center networks. The topology of the underlying IP network ("underlay") is hidden from the user of the overlay network. While the transparency of the underlay is acceptable and even desirable in some cases, it provides challenges in case a customer desires to control or trace the exact path a certain set of traffic takes (unicast or multicast) or more generically, correlate overlay and underlay.

Segment Routing (SR) provides a solution to traffic engineer the path that a certain traffic takes in an IPv6 network which does not incurr state per traffic engineered flow in the underlay. Much like VXLAN and LISP with IPv6 dataplane, SR with IPv6 dataplane encapsulates the user-traffic into IPv6.

This disclosure describes the integration of LISP/VXLAN and SR to allow the control of the path unicast or multicast traffic in the overlay takes in the network as well as trace the path of a packet without the need to send probe packets. Deployment dependent the control can either be done by the encapsulating or decapsulating device, or a server.

VXLAN SR Integration:

In VXLAN the egress tunnel endpoint (VTEP) learns the inner source MAC address to the outer source IP address mapping. It stores this mapping in a table so that when a response packet is sent, there is no need for "destination unknown" flooding of the packet. In a deployment which also has SR enabled (i.e. the tunnel endpoint knows the network topology and all nodal/adjacency SIDs), this disclosure describes the following:

Add the SRheader (intermediate routing ext header with new type T) to the mapping table that the ingress and egress tunnel endpoint maintain;

Add the SRheader to the VXLAN encapsulation.

Deployment dependent, the SRheader could be added to both: The Source IPv6 address as well as the Destination IPv6 address. Adding the SR header to the source IPv6 address allows the ingress tunnel endpoint to communicate the desired path to the ingress. While learning the MAC to IPaddress mapping, an endpoint can decide whether it would include the SRinformation from the source address into the mapping table, or would include locally computed SR information into the mapping table.

LISP SR Integration:

The LISP control plane relies on a mapping system to determine the RLOC to EID mapping for a destination EID. Independent from how the mapping system is implemented, a mapping is returned in an EIDtoRLOC MapReply Message either directly by the ETR or by a MapServer which serves as a replyproxy.

Similar to what was discussed for VXLAN, this disclosure describes the following:

Add the SRheader (intermediate routing ext header with new type T) to the mapping table that the ingress and egress tunnel endpoint (ITR/ETR) maintain;

Add the SRheader to the LISP encapsulation for IPv6 dataplane;

Add the SRheader to EIDtoRLOC MapReply Message.

Depending on how the mapping system is implemented, this either allows the MapServer (in case of reply proxy deployments in this case one could perform central path computation in the sense of "SDN"), or the ETR (egress determines the path towards it), or the ITR (ingress determines the path which is possible without extensions) to determine which SRheader is used.

Troubleshooting:

If the encapsulation of LISP and VXLAN for an IPv6 dataplane are extended to also allow for an SRheader to be included, a slightly modified version of the SRheader can be used for trouble shooting purposes: this disclosure describes a new routing type "X" for the routing extension header (43). The structure of the routing extension header is the same as that used for SR, though the use differs:

When a device receives an IPv6 packet with SRheader, type X, it'll also document the local forwarding decision taken by adding the appropriate SID to the SRheader (best used for adjacency segments).

Extend the LISP and VXLAN mapping operations and frame formats to include SegmentRouting headers so that topology aware overlays can be built. Leverage a modified version of the SRheader to document the path of a packet through the network which way every packet comes with tracing information, a quality many customers desire.

Part III Controller/Mapping System

Overview

Switching (MPLS) or Internet Protocol (IP) based) that interconnects Customer Premises Equipment (CPE). MPLS-based VPNs are mature and offer a rich set of VPN features and functionality such as, for example, support for complex VPN topologies.

Such VPN technologies can be used in combination with Traffic Engineering (i.e. Resource Reservation Protocol-Traffic Engineering (RSVP-TE) or Segment Routing) or service chaining technologies (i.e., Network Service Header (NSH)). However, these are independent technologies with no explicit integration. Therefore, when these technologies are used together, a higher level orchestration system is required to configure the separate technologies so that they work in concert in order to create end-to-end services. In practice, the creation of the higher level orchestration system can be very complicated, with each technology having different dependencies requiring separate configuration, which may in turn impact different devices. As a result, in conventional arrangements, these technologies are generally not used in concert, but instead are deployed and operated independently. This independent operation limits the ability of a network operator (Service Provider) to exploit the value of the underlying networks and services.

Despite their richness of features and functionality, Service Provider (SP) virtual private networks built on MPLS are being challenged today because they are perceived as complex, slow to provision, difficult to manage, and expensive. The distributed network protocols are further challenged to scale to the aggregated number of routes across the VPNs of the service provider's tenants. Additionally, since VPN services are virtualized and separated from the underlying transport, the hierarchical functional decomposition of MPLS VPNs (e.g., customer edge (CE), provider edge (PE), and/or Provider (P) components) has been aligned to the physical network hierarchy. However, this hierarchy is no longer required and instead incurs cost and complexity and is not well suited to deliver, for example, VPN as a Service (VPNaaS).

CPE-to-CPE IP overlay VPNs potentially offer the lowest cost solution because such configurations remove the need for any service aware routers at the core and edge of the network (i.e., at the PE and P routers). However, there are no CPE-to-CPE overlay VPN control plane/data plane solutions which provide the functionality and scale needed for Service Providers to meet enterprise requirements. Furthermore, IP overlay VPNs today treat the Service Provider underlay network as a simple (i.e., "dumb") transport, which limits the ability to exploit the value of the underlying networks and services. That is, the underlying networks/services do not have an understanding of, or integration with, for example, Segment Routing.

In conventional practical arrangements, different VPN technologies are applied in different market segments (e.g., MPLS VPNs in enterprise, Dynamic Multipoint VPNs (DM-VPNs) in Small and Medium enterprises (SMEs), hub/spoke Internet Protocol Security (IPsec) in Small and Medium Businesses (SMBs), etc.).

iVPN is a new edge-to-edge IP Overlay Layer 2 (L2)/Layer 3 (L3) VPN system architecture and associated techniques that utilize a centralized control infrastructure as the single policy control point for all network services so as to integrate VPN policy, Traffic Engineering (Segment Routing) policy, service insertion policy (NSH), and crypto/encryption policies. In general, iVPN leverages and enhances the Locator/ID Separation Protocol (LISP) Architecture. Presented herein is a policy resolver (LISP MAP resolver) forming part of an iVPN system.

The iVPN system architecture uses a centralized control infrastructure which is generally shown in FIGS. 1 and 2. As shown, the iVPN system includes an orchestrator, a policy resolution function, sometimes referred to herein as an iVPN or VPN policy resolver or simply policy resolver, a LISP mapping server (forwarding state server), and a key management server (key mgmt. server).

The VPN policy resolver described herein is an enhancement to the LISP architecture which simplifies and unifies the application of VPN, Traffic Engineering and segment routing policies. As shown in FIG. 2, the VPN policy resolver resides between a higher level provisioning/orchestrator and a forwarding state server, e.g. the LISP mapping server.

As described previously, the orchestrator is a cross domain orchestrator that is responsible for instantiating the end-to-end services by pushing abstracted service policies to the policy resolution function. The orchestrator is multi-tenant and maintains the database of policies that have been applied. The orchestration function pushes abstracted connectivity (VPN) policy, service insertion (NSH) policy, path preference (Segment Routing) policy, and crypto/encryption policies to the VPN policy resolver.

In general, the VPN policy resolver operates to, for example, resolve discrete policies to forwarding state, compound and reconcile overlapping policies, and push resulting resolved forwarding state to mapping server. The VPN policy resolver (policy resolution function) is the single point for applying policies in the system. The VPN policy resolver exposes an abstracted northbound interface to the higher level orchestration function that can apply policies which include, for example, VPN connectivity policies, Traffic engineering policies, Service insertion policies, and Crypto and/or Encryption policies. The VPN policy resolver is responsible for resolving discrete policies to forwarding state, compounding and reconciling overlapping policies, pushing the resulting resolved forwarding state to the forwarding state server, from which it is served to clients, and pushing resolved Crypto and Encryption policies to the Key Management and Crypto Server. The policy resolution function is multitenant and stateless.

As described above, FIG. 4 illustrates a LISP overlay VPN with no state in the mapping server and a default policy of no connectivity. In the example of FIG. 4, a policy is applied to assign the sites {a, b, c} to VPN1, and to assign the sites {c, d, e} to VPN2. The VPN policy resolver resolves these policies to the LISP forwarding state required to realize these connectivity policies as shown in FIG. 5.

A policy is next applied to specify a traffic engineering policy indicating that traffic sent from site a to site b must be routed via x. The policy resolver resolves this policy to the segment routing forwarding state required to realize this policy. As this policy overlaps with the preceding VPN policy (i.e., both impact traffic sent from site a to site b), the VPN policy resolver compounds the forwarding state as shown in FIG. 6.

A policy is next applied to specify a service insertion policy indicating that traffic sent from site c to site e must go via service s. The policy resolver resolves this policy to the NSH forwarding state required to realize this policy. As this policy overlaps with the preceding VPN policy (i.e., both impact traffic sent from site c to site e), the VPN policy resolver compounds the forwarding state as shown in FIG. 7.

FIG. 8 is a schematic diagram illustrating crypto/encryption policies in accordance with examples presented herein. FIG. 9 is a schematic diagram illustrating crypto/encryption policy resolution in accordance with examples presented herein.

As noted above, examples presented herein are directed to a VPN policy resolver that operates as an enhancement to the LISP architecture. The VPN policy resolver simplifies and unifies the application of VPN, Traffic Engineering, NSH, and crypto/encryption policies, thereby enabling these technologies to be used in concert (i.e., the VPN policy resolver enables application of a unified policy model for network services). As such, a network operator is able to exploit the value of the underlying networks and services. The techniques presented herein make it easy to deploy services which combine VPNs, with Traffic Engineering (via Segment routing), and Service Insertion (via NSH). Conventionally, these technologies have been deployed independently, rather than in concert. The techniques presented herein allow the combinations of VPN policy, Traffic Engineering policy and service insertion policy to be easily defined and deployed.

Variations and Implementations

While details of certain embodiments of the present disclosure are described with reference to LISP and/or the use case of VPNs, these teachings are equally applicable, with modifications that would be apparent to a person of ordinary skill in the art based on the descriptions provided herein, to VXLAN and/or the use case of DCs. For example, as a person of ordinary skill in the art would readily recognize, references to Locators and EIDs described above are made in the context of LISP. However, as used herein, these terms represent a general notion present in any overlay technology. For example, in a VXLAN implementation, equivalent constructs may be found in the form of VTEPs and Hosts corresponding to RLOCs and EIDs respectively.

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate operations thereof related to the mapping system functionality described herein. This may be inclusive of appropriate algorithms and communication protocols that allow for the effective exchange of data or information.

In one implementation, leaf nodes described herein may include software to achieve (or to foster) the mapping system functionality discussed herein, where the software may be executed on one or more processors to carry out the functions. This could include the implementation of instances of programming logic and/or any other suitable element that would foster the activities discussed herein. Additionally, each of the leaf nodes can have an internal structure (e.g., a processor, a memory element, etc.) to facilitate some of the operations described herein. In other embodiments, these functions for mapping system may be executed externally to the leaf nodes, or included in some other network element to achieve the intended functionality. Alternatively, leaf nodes may include software (or reciprocating software) that can coordinate with other network elements in order to achieve the functions related to the mapping system described herein. In still other embodiments, one or several devices may include any suitable algorithms, hardware, software, components, modules, interfaces, or objects that facilitate the operations thereof.

In certain example implementations, functions related to the mapping system described herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases to enable functions disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the mapping system functionality described herein. Additionally, each of these devices may include a processor that can execute software or an algorithm to perform the mapping system functionality as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term "memory element."

Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of the mapping system functionality, as potentially applied to a myriad of other architectures.

It is also important to note that the steps in the figures illustrate only some of the possible scenarios that may be executed by, or within, the mapping system described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the mapping system in that any suitable arrangements, chronologies, configurations, and timing mechanisms may be provided without departing from the teachings of the present disclosure.

It should also be noted that many of the previous discussions may imply a single client server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke 15 paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. One or more non-transitory computer readable storage media encoded with software comprising computer executable instructions and when the software is executed operable to implement a mapping system that provides a single policy control point for Virtual Private Networks (VPNs), the instructions operable when executed to:
   program, via a northbound interface, directly into a mapping database at the mapping system (i) VPN policies including Locator/ID Separation Protocol (LISP)-based source-destination mappings between endpoint identifiers (EIDs) and corresponding routing locators (RLOCs) for routers, (ii) segment routing (SR) policies including, in an SR field of the mapping database, indications of routers to be used as intermediate path hops between source routers and destination routers in connection with a forwarding policy; (iii) network service header (NSH) policies for which at least some of the source-destination mappings include corresponding NSHs identifying service chains of service functions; and (iv) encryption policies to be applied to the VPNs;
   receive, from a first tunneling router associated with a first virtual network, a mapping request to a second virtual network, the first tunneling router compliant with the LISP, the mapping request comprising an EID tuple that includes a source identifier and a destination identifier, wherein the source identifier is located in a first portion of the EID tuple;
   identify a first RLOC using a longest match algorithm based, at least in part, on the source identifier and the destination identifier of the EID tuple from the mapping database and identify an indication of an intermediate path hop from the indications of routers corresponding to the first RLOC; and
   transmit the first RLOC and the indication of the intermediate path hop to the first tunneling router.

2. The one or more non-transitory computer readable storage media of claim 1, wherein the instructions are further operable when executed to render the forwarding policy based, at least in part, on the source identifier from the EID tuple.

3. The one or more non-transitory computer readable storage media of claim 2, wherein the instructions are further operable when executed to identify the first RLOC based on the forwarding policy.

4. The one or more non-transitory computer readable storage media of claim 2, wherein the instructions are further operable to resolve a policy associated with the source identifier into a forwarding state.

5. The one or more non-transitory computer readable storage media of claim 1, wherein the source-destination mappings are configured as LISP-based source-destination mappings extended to include the SR field.

6. The one or more non-transitory computer readable storage media of claim 1, wherein at least some of the source-destination mappings include corresponding network service headers (NSHs) identifying service chains of service functions, and the instructions are further operable, when executed, to receive the mapping request to include an NSH identifying a service chain, use the NSH in the mapping request as a key to identify a next hop in the service chain, and transmit to the first tunneling router information identifying the next hop in the service chain.

7. The one or more non-transitory computer readable storage media of claim 6, wherein the source-destination mappings are configured as LISP-based source-destination mappings extended to include the corresponding NSHs.

8. The one or more non-transitory computer readable storage media of claim 6, wherein the corresponding NSHs each includes a service path identifier (SPI) and a service index (SI).

9. One or more non-transitory computer readable storage media encoded with software comprising computer executable instructions and when the software is executed operable to implement a mapping system that provides a single policy control point for Virtual Private Networks (VPNs), the instructions operable when executed to:
   program, via a northbound interface, directly into a mapping database at the mapping system (i) VPN policies including Locator/ID Separation Protocol (LISP)-based source-destination mappings between endpoint identifiers (EIDs) and corresponding routing locators (RLOCs) for routers, (ii) segment routing (SR) policies including, in an SR field of the mapping database, indications of routers to be used as intermediate path hops between source routers and destination routers in connection with a forwarding policy; (iii) network service header (NSH) policies for which at least some of the source-destination mappings include corresponding NSHs identifying service chains of service functions; and (iv) encryption policies to be applied to the VPNs;

receive, from a first tunneling router associated with a first virtual network, a mapping request to a second virtual network, the first tunneling router compliant with the LISP, the mapping request comprising an RLOC tuple that includes a source identifier and a destination identifier, wherein the source identifier is located in a first portion of the RLOC tuple;

identify a first endpoint identifier for a destination using a longest match algorithm based, at least in part, on the source identifier and the destination identifier of the RLOC tuple, and identify an indication of an intermediate path hop from the indications of routers corresponding to the first endpoint identifier; and transmit the first endpoint identifier and the indication of the intermediate path hop to the first tunneling router.

10. The one or more non-transitory computer readable storage media of claim 9, wherein the instructions are further operable when executed to render the forwarding policy based, at least in part, on the source identifier from the RLOC tuple.

11. The one or more non-transitory computer readable storage media of claim 10, wherein the instructions are further operable when executed to identify the first endpoint identifier based on the forwarding policy.

12. The one or more non-transitory computer readable storage media of claim 10, wherein the instructions are further operable to resolve a policy associated with the source identifier into a forwarding state.

13. The one or more non-transitory computer readable storage media of claim 9, wherein the source-destination mappings are configured as LISP-based source-destination mappings extended to include the SR field.

14. The one or more non-transitory computer readable storage media of claim 9, wherein the instructions are further operable, when executed, to receive the mapping request to include an NSH identifying a service chain, use the NSH in the mapping request as a key to identify a next hop in the service chain, and transmit to the first tunneling router information identifying the next hop in the service chain.

15. The one or more non-transitory computer readable storage media of claim 14, wherein the source-destination mappings are configured as LISP-based source-destination mappings extended to include the corresponding NSHs.

16. The one or more non-transitory computer readable storage media of claim 14, wherein the corresponding NSHs each includes a service path identifier (SPI) and a service index (SI).

17. A method comprising:
implementing a mapping system that provides a single policy control point for Virtual Private Networks (VPNs), the implementing including programming, via a northbound interface, directly into a mapping database at the mapping system (i) VPN policies including Locator/ID Separation Protocol (LISP)-based source-destination mappings between endpoint identifiers (EIDs) and corresponding routing locators (RLOCs) for routers, (ii) segment routing (SR) policies including, in an SR field of the mapping database, indications of routers to be used as intermediate path hops between source routers and destination routers in connection with a forwarding policy; (iii) network service header (NSH) policies for which at least some of the source-destination mappings include corresponding NSHs identifying service chains of service functions; and (iv) encryption policies to be applied to the VPNs;

receiving, from a first tunneling router associated with a first virtual network, a mapping request to a second virtual network, the first tunneling router compliant with the LISP, the mapping request comprising an endpoint identifier (EID) tuple that includes a source identifier and a destination identifier, wherein the source identifier is located in a first portion of the EID tuple;

identifying a first RLOC using a longest match algorithm based, at least in part, on the source identifier and the destination identifier of the EID tuple, and identifying an indication of an intermediate path hop from the indications of routers corresponding to the first RLOC; and transmitting the first RLOC and the indication of the intermediate path hops to the first tunneling router.

18. The method of claim 17, further comprising:
rendering the forwarding policy based, at least in part, on the source identifier from the EID tuple.

19. The method of claim 17, wherein the source-destination mappings are configured as LISP-based source-destination mappings extended to include the SR field.

20. A method comprising:
implementing a mapping system that provides a single policy control point for Virtual Private Networks (VPNs), the implementing including programming, via a northbound interface, directly into a mapping database at the mapping system (i) VPN policies including Locator/ID Separation Protocol (LISP)-based source-destination mappings between endpoint identifiers (EIDs) and corresponding routing locators (RLOCs) for routers, (ii) segment routing (SR) policies including, in an SR field of the mapping database, indications of routers to be used as intermediate path hops between source routers and destination routers in connection with a forwarding policy; (iii) network service header (NSH) policies for which at least some of the source-destination mappings include corresponding NSHs identifying service chains of service functions; and (iv) encryption policies to be applied to the VPNs;

receiving, from a first tunneling router associated with a first virtual network, a mapping request to a second virtual network, the first tunneling router compliant with the LISP, the mapping request comprising an RLOC tuple that includes a source identifier and a destination identifier, wherein the source identifier is located in a second portion of the RLOC tuple;

identifying a first endpoint identifier for a destination using a longest match algorithm based, at least in part, on the source identifier and the destination identifier of the RLOC tuple, and identifying an indication of an intermediate path hop from the indications of routers corresponding to the first endpoint identifier; and transmitting the first endpoint identifier and the indication of the intermediate path hop to the first tunneling router.

21. The method of claim 20, further comprising:
rendering the forwarding policy based, at least in part, on the source identifier from the RLOC tuple.

22. The method of claim 20, wherein the source-destination mappings are configured as LISP-based source-destination mappings extended to include the SR field.

23. An apparatus comprising:
a processor; and
a memory configured to store instructions executable by the processor, wherein the processor is configured to implement a mapping system that provides a single policy control point for Virtual Private Networks (VPNs), wherein the processor is further configured to:

program, via a northbound interface, directly into a mapping database at the mapping system (i) VPN policies including Locator/ID Separation Protocol (LISP)-based source-destination mappings between endpoint identifiers (EIDs) and corresponding routing locators (RLOCs) for routers, (ii) segment routing (SR) policies including, in an SR field of the mapping database, indications of routers to be used as intermediate path hops between source routers and destination routers in connection with a forwarding policy; (iii) network service header (NSH) policies for which at least some of the source-destination mappings include corresponding NSHs identifying service chains of service functions; and (iv) encryption policies to be applied to the VPNs;

receive, from a first tunneling router associated with a first virtual network, a mapping request to a second virtual network, the first tunneling router compliant with the LISP, the mapping request comprising an EID tuple that includes a source identifier and a destination identifier, wherein the source identifier is located in a second portion of the EID tuple;

identify a first RLOC using a longest match algorithm based, at least in part, on the source identifier and the destination identifier of the EID tuple from the mapping database, and identify an indication of an intermediate path hop from the indications of routers corresponding to the first RLOC; and transmit the first RLOC and the indication of the intermediate path hop to the first tunneling router.

24. The apparatus of claim 23, wherein the processor is further configured to render the forwarding policy based, at least in part, on the source identifier from the EID tuple.

25. The apparatus of claim 23, wherein the source-destination mappings are configured as LISP-based source-destination mappings extended to include the SR field.

26. An apparatus comprising:
a processor; and
a memory configured to store instructions executable by the processor, wherein the processor is configured to implement a mapping system that provides a single policy control point for Virtual Private Networks (VPNs), wherein the processor is further configured to:

program, via a northbound interface, directly into a mapping database at the mapping system (i) VPN policies including Locator/ID Separation Protocol (LISP)-based source-destination mappings between endpoint identifiers (EIDs) and corresponding routing locators (RLOCs) for routers, (ii) segment routing (SR) policies including, in an SR field of the mapping database, indications of routers to be used as intermediate path hops between source routers and destination routers in connection with a forwarding policy; (iii) network service header (NSH) policies for which at least some of the source-destination mappings include corresponding NSHs identifying service chains of service functions; and (iv) encryption policies to be applied to the VPNs;

receive, from a first tunneling router associated with a first virtual network, a mapping request to a second virtual network, the first tunneling router compliant with the LISP, the mapping request comprising an RLOC tuple that includes a source identifier and a destination identifier, wherein the source identifier is located in a second portion of the RLOC tuple;

identify a first endpoint identifier for a destination using a longest match algorithm based, at least in part, on the source identifier and the destination identifier of the RLOC tuple, and identify an indication of an intermediate path hop from the indications of routers corresponding to the first endpoint identifier; and transmit the first endpoint identifier and the indication of the intermediate path hop to the first tunneling router.

27. The apparatus of claim 26, wherein the processor is further configured to render the forwarding policy based, at least in part, on the source identifier from the RLOC tuple.

28. The apparatus of claim 26, wherein the source-destination mappings are configured as LISP-based source-destination mappings extended to include the SR field.

\* \* \* \* \*